United States Patent

Kiko

[11] 4,192,974
[45] Mar. 11, 1980

[54] MULTI-SECTION APPARATUS FOR IMPROVING SIGNAL TRANSMISSION THROUGH TELEPHONE TRANSMISSION LINES

[75] Inventor: Frederick J. Kiko, Lorain, Ohio

[73] Assignee: Lorain Products Corporation, Lorain, Ohio

[21] Appl. No.: 888,501

[22] Filed: Mar. 20, 1978

[51] Int. Cl.$^2$ ............................................. H04B 3/36
[52] U.S. Cl. .............................. 179/16 F; 179/170 R; 179/170 G; 333/217
[58] Field of Search ............... 333/17 R, 17 M, 80 R, 333/80 T, 213, 216, 217; 179/16 F, 170 R, 170 G, 170 T

[56] References Cited

U.S. PATENT DOCUMENTS

| | | | |
|---|---|---|---|
| 3,706,862 | 12/1972 | Chambers, Jr. | 179/170 T |
| 3,818,151 | 6/1974 | Chambers, Jr. et al. | 179/170 T |
| 3,828,281 | 8/1974 | Chambers, Jr. | 333/17 |
| 3,989,906 | 11/1976 | Kiko | 179/170 R |
| 3,989,907 | 11/1976 | Chambers, Jr. | 179/170 R |
| 4,032,726 | 6/1977 | Chambers, Jr. | 179/16 F |
| 4,037,066 | 7/1977 | Kiko | 179/16 F |
| 4,061,883 | 12/1977 | Chambers, Jr. | 179/16 F |

Primary Examiner—Bernard Konick
Assistant Examiner—Randall P. Myers
Attorney, Agent, or Firm—Michael M. Rickin; Alan H. Haggard

[57] ABSTRACT

An apparatus for providing simultaneously a multiplicity of independent non-interactive effects on the transmission characteristics of a voice-frequency telephone transmission line. Output voltage and current signal processing circuitry is provided which generates voltages for insertion in series with the line and currents for insertion in shunt with the line. Input voltage and current signal processing circuitry is also provided to sense the signal voltage across and the signal current through the transmission line and to generate a multiplicity of voltages and currents which are functions of the signal voltage and the signal current as well as of the voltages and currents fed back from the output signal processing circuitry to the input signal processing circuitry. A multiplicity of line conditioning control units couple the input signal processing circuitry to the output signal processing circuitry. Each line conditioning control unit is adapted to affect the transmission characteristics of the line without interferring with the effects simultaneously provided by the other line conditioning control units.

47 Claims, 20 Drawing Figures

WHERE:

(1) $V_O = V_{O_1} + V_{O_2} + V_{O_3}$ (2a) $V_{T_1} = V_T + \frac{1}{2}(V_{O_2} + V_{O_3})$ (2b) $V_{T_1} = 2V_T - V_{T_3} + \frac{1}{2}(V_{O_3} - V_{O_1})$ (3) $V_{T_2} = V_T + \frac{1}{2}(V_{O_3} - V_{O_1})$ (4a) $V_{T_3} = V_T - \frac{1}{2}(V_{O_2} + V_{O_1})$ (4b) $V_{T_3} = V_T - \frac{V_O}{2} + \frac{1}{2}(V_{O_3} - V_{O_1}) + \frac{V_{O_1}}{2}$ (5) $I_O = I_{O_1} + I_{O_2} + I_{O_3}$ (6a) $I_{T_1} = I_T + \frac{1}{2}(I_{O_2} + I_{O_3})$ (6b) $I_{T_1} = 2I_T - I_{T_3} + \frac{1}{2}(I_{O_3} - I_{O_1})$ (7) $I_{T_2} = I_T + \frac{1}{2}(I_{O_3} - I_{O_1})$ (8a) $I_{T_3} = I_T - \frac{1}{2}(I_{O_2} + I_{O_1})$ (8b) $I_{T_3} = I_T - \frac{I_O}{2} + \frac{1}{2}(I_{O_3} - I_{O_1}) + \frac{I_{O_1}}{2}$ (9) $V_{O_1} = K_1 V_{T_1} + I_{T_1} Z_1$

(10) $V_{O_2} = K_3 V_{T_2} + I_{T_2} Z_3$

(11) $V_{O_3} = K_5 V_{T_3} + I_{T_3} Z_5$

(12) $I_{O_1} = K_2 I_{T_1} + V_{T_1}/Z_2$

(13) $I_{O_2} = K_4 I_{T_2} + V_{T_2}/Z_4$

(14) $I_{O_3} = K_6 I_{T_3} + V_{T_3}/Z_6$

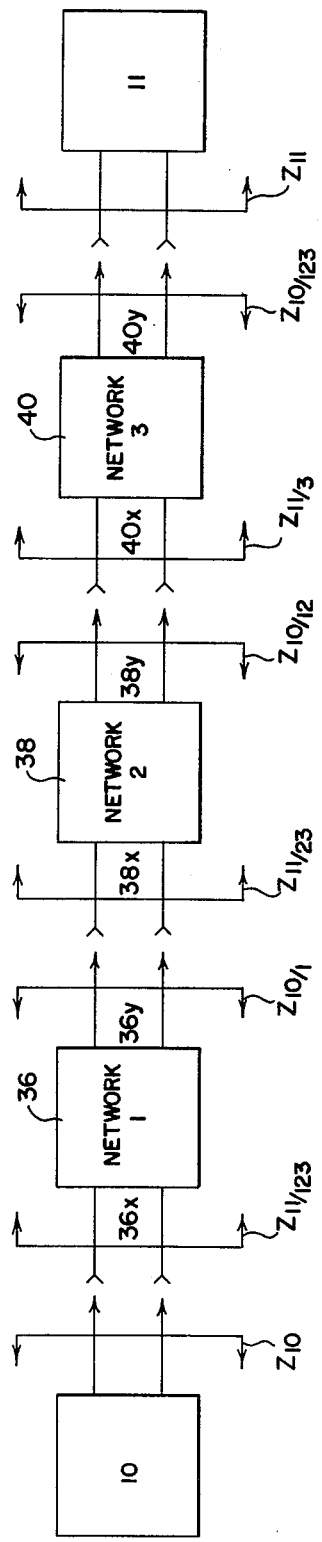
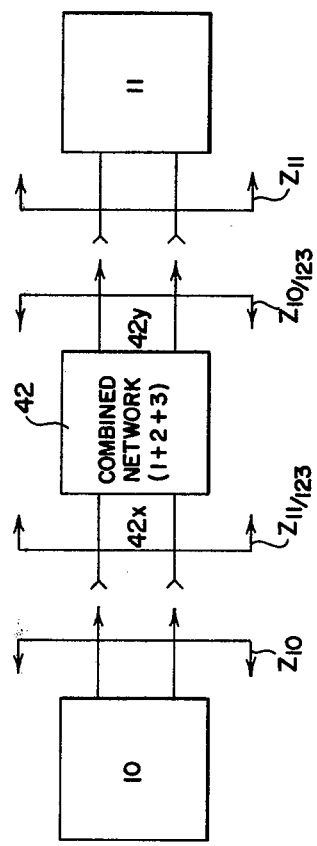
FIG. 2a
FIG. 2b $$(15) \quad Z_{11/123} = \frac{\left(1+\frac{K_1}{2}\right)\left(1-\frac{K_2}{2}\right)+\frac{Z_1}{4Z_2}+\frac{Z_1}{Z_{11/23}}}{\left(1-\frac{K_1}{2}\right)\left(1+\frac{K_2}{2}\right)+\frac{Z_1}{4Z_2}+\frac{Z_{11/23}}{Z_2}} \cdot \frac{\left(1+\frac{K_3}{2}\right)\left(1-\frac{K_4}{2}\right)+\frac{Z_3}{4Z_4}+\frac{Z_3}{Z_{11/3}}}{\left(1-\frac{K_3}{2}\right)\left(1+\frac{K_4}{2}\right)+\frac{Z_3}{4Z_4}+\frac{Z_{11/3}}{Z_4}} \cdot \frac{\left(1+\frac{K_5}{2}\right)\left(1-\frac{K_6}{2}\right)+\frac{Z_5}{4Z_6}+\frac{Z_5}{Z_{11}}}{\left(1-\frac{K_5}{2}\right)\left(1+\frac{K_6}{2}\right)+\frac{Z_5}{4Z_6}+\frac{Z_{11}}{Z_6}} \cdot Z_{11}$$

WHERE:

$$(16a) \quad Z_{11/3} = \frac{\left(1+\frac{K_5}{2}\right)\left(1-\frac{K_6}{2}\right)+\frac{Z_5}{4Z_6}+\frac{Z_5}{Z_{11}}}{\left(1-\frac{K_5}{2}\right)\left(1+\frac{K_6}{2}\right)+\frac{Z_5}{4Z_6}+\frac{Z_{11}}{Z_6}} \cdot Z_{11}$$

$$(16b) \quad Z_{11/23} = \frac{\left(1+\frac{K_3}{2}\right)\left(1-\frac{K_4}{2}\right)+\frac{Z_3}{4Z_4}+\frac{Z_3}{Z_{11/3}}}{\left(1-\frac{K_3}{2}\right)\left(1+\frac{K_4}{2}\right)+\frac{Z_3}{4Z_4}+\frac{Z_{11/3}}{Z_4}} \cdot Z_{11/3}$$

$$(17) \quad G_{10/11} = \frac{\left(1+\frac{Z_{10}}{Z_{11}}\right)}{\left(1+\frac{Z_{10}}{Z_{11/23}}\right)} \cdot \frac{\left(1-\frac{K_1}{2}\right)\left(1-\frac{K_2}{2}\right)-\frac{Z_1}{4Z_2}}{\left(1+\frac{K_1}{2}\right)\left(1-\frac{K_2}{2}\right)+\frac{Z_1}{4Z_2}+\frac{Z_1}{Z_{11/23}}} \cdot \frac{\left(1-\frac{K_3}{2}\right)\left(1-\frac{K_4}{2}\right)-\frac{Z_3}{4Z_4}}{\left(1+\frac{K_3}{2}\right)\left(1-\frac{K_4}{2}\right)+\frac{Z_3}{4Z_4}+\frac{Z_3}{Z_{11/3}}} \cdot \frac{\left(1-\frac{K_5}{2}\right)\left(1-\frac{K_6}{2}\right)-\frac{Z_5}{4Z_6}}{\left(1+\frac{K_5}{2}\right)\left(1-\frac{K_6}{2}\right)+\frac{Z_5}{4Z_6}+\frac{Z_5}{Z_{11}}}$$

FIG. 3a $$(18) \quad Z_{10/123} = \frac{\left(1-\frac{K_5}{2}\right)\left(1+\frac{K_6}{2}\right)+\frac{Z_5}{4Z_6}+\frac{Z_5}{Z_{10/12}}}{\left(1+\frac{K_5}{2}\right)\left(1-\frac{K_6}{2}\right)+\frac{Z_5}{4Z_6}} \cdot \frac{Z_{10/12}}{Z_6} \cdot \frac{\left(1-\frac{K_3}{2}\right)\left(1+\frac{K_4}{2}\right)+\frac{Z_3}{4Z_4}+\frac{Z_3}{Z_{10/1}}}{\left(1+\frac{K_3}{2}\right)\left(1-\frac{K_4}{2}\right)+\frac{Z_3}{4Z_4}} \cdot \frac{Z_{10/1}}{Z_4} \cdot \frac{\left(1-\frac{K_1}{2}\right)\left(1+\frac{K_2}{2}\right)+\frac{Z_1}{4Z_2}+\frac{Z_1}{Z_{10}}}{\left(1+\frac{K_1}{2}\right)\left(1-\frac{K_2}{2}\right)+\frac{Z_1}{4Z_2}} \cdot Z_{10}$$

WHERE:

$$(19a) \quad Z_{10/1} = \frac{\left(1-\frac{K_1}{2}\right)\left(1+\frac{K_2}{2}\right)+\frac{Z_1}{4Z_2}+\frac{Z_1}{Z_{10}}}{\left(1+\frac{K_1}{2}\right)\left(1-\frac{K_2}{2}\right)+\frac{Z_1}{4Z_2}} \cdot \frac{Z_{10}}{Z_2} \cdot Z_{10}$$

$$(19b) \quad Z_{10/12} = \frac{\left(1-\frac{K_3}{2}\right)\left(1+\frac{K_4}{2}\right)+\frac{Z_3}{4Z_4}+\frac{Z_3}{Z_{10/1}}}{\left(1+\frac{K_3}{2}\right)\left(1-\frac{K_4}{2}\right)+\frac{Z_3}{4Z_4}} \cdot \frac{Z_{10/1}}{Z_4} \cdot Z_{10/1}$$

$$(20) \quad G_{11/10} = \frac{\left(1+\frac{Z_{11}}{Z_{10}}\right)}{\left(1+\frac{Z_{11}}{Z_{10/123}}\right)} \cdot \frac{\left(1+\frac{K_5}{2}\right)\left(1+\frac{K_6}{2}\right)-\frac{Z_5}{4Z_6}}{\left(1-\frac{K_5}{2}\right)\left(1+\frac{K_6}{2}\right)+\frac{Z_5}{4Z_6}+\frac{Z_5}{Z_{10/12}}} \cdot \frac{\left(1+\frac{K_3}{2}\right)\left(1+\frac{K_4}{2}\right)-\frac{Z_3}{4Z_4}}{\left(1-\frac{K_3}{2}\right)\left(1+\frac{K_4}{2}\right)+\frac{Z_3}{4Z_4}+\frac{Z_3}{Z_{10/1}}} \cdot \frac{\left(1+\frac{K_1}{2}\right)\left(1+\frac{K_2}{2}\right)-\frac{Z_1}{4Z_2}}{\left(1-\frac{K_1}{2}\right)\left(1+\frac{K_2}{2}\right)+\frac{Z_1}{4Z_2}+\frac{Z_1}{Z_{10}}}$$

MULTI-SECTION APPARATUS FOR IMPROVING SIGNAL TRANSMISSION THROUGH TELEPHONE TRANSMISSION LINES

BACKGROUND OF THE INVENTION

The present invention relates to circuitry for affecting the characteristics of a telephone transmission line to thereby improve signal transmission through the line and more particularly to circuitry which, by the generation of a single voltage and a single current, causes a multiplicity of simultaneous non-interactive effects on the transmission characteristics of the line.

In communication systems wherein voice signals are transmitted over substantial distances through transmission lines, it is necessary to provide circuitry which can compensate for the attenuation of the signals by the transmission line. In telephone systems, for example, it is necessary to provide amplifier circuits or repeaters to maintain satisfactory signal transmission through telephone lines which, in the absence of such circuits, would excessively attenuate the signals transmitted therethrough.

In the development of circuitry for transmitting voice frequency signals over transmission lines, a variety of types of repeater circuits have been employed. One of these types of repeater circuits is a repeater having a series amplifying network for inserting in series with the transmission line, an amplifying voltage which varies in accordance with the siganl voltage across the transmission line and a shunt amplifying network for inserting, in shunt with the transmission line, an amplifying current which varies in accordance with the signal current through the transmission line. In such circuits, it may be shown that if the ratio of amplifying voltage to signal voltage is equal in magnitude, but opposite in sign to the ratio of amplifying current to signal current, the circuit may function as an impedance matching circuit. It may also be shown that if the above ratios are equal in magnitude and have the same sign, then the circuit may function as a repeater which compensates for the frequency independent attenuation of loaded transmission lines or the frequency dependent attenuation of non-loaded transmission lines. One such repeater which compensates for the attenuation of signals in a loaded transmission line is shown and described in U.S. Pat. No. 3,706,862 granted in the name of C. W. Chambers, Jr. on Dec. 19, 1972. A repeater which compensates for the attenuation of signals in a non-loaded transmission line is shown and described in U.S. Pat. No. 3,818,151 granted in the name of C. W. Chambers, Jr. et al on June 18, 1974. Repeater circuits of these types are referred to as amplifying type repeaters.

Another of these types of repeater circuits is a repeater having impedance simulating networks which provide gain by simulating the presence of negative resistances (or impedances) in series and/or in shunt with the transmission lines. These impedance simulating networks may also be utilized to simulate the presence of positive impedance and thereby serve as line-build-out networks or attenuator pads. One such type of repeater is shown and described in U.S. Pat. No. 3,828,281 granted in the name of C. W. Chambers, Jr. on Aug. 6, 1974. Circuits of either of these types are referred to as impedance simulating type networks.

The function performed by each of the types of repeater circuits described above can be referred to as line conditioning. Hereinafter these types of repeater circuits will each or both or in any combination be referred to as line conditioning units (LCU's). It should be understood that a line conditioning unit typically comprises an input voltage signal processing means for sensing the signal voltage across the transmission line, an input current signal processing means for sensing the signal current through the transmission line, an output voltage signal processing means for generating a voltage for insertion in series with the transmission line, an output current signal processing means for generating a current for insertion in shunt with the transmission line and one or more networks coupled between the input voltage and current processing means and the output voltage and current processing means.

In particular, an amplifying type LCU has a first "amplifying" network coupled between the input voltage processing means and the output voltage processing means and a second "amplifying" network coupled between the input current processing means the the output current processing means. Hereinafter these "amplifying" networks will be referred to as gain control means. An impedance simulating type LCU has a first "impedance" network coupled between the input voltage processing means and the output current processing means and a second "impedance" network coupled between the input current processing means and the output voltage processing means. Hereinafter these "impedance" networks will be referred to as impedance simulating control means.

Due to the relatively high cost of purchasing and operating a separate repeater for each transmission line, it has been found desirable to operate line conditioning units in a common mode configuration i.e., a configuration in which a relatively small number of units is switched among a relatively large number of occasionally used transmission lines. For amplifying type repeaters, circuitry can be provided which automatically varies the magnitude of the amplifying voltages and currents which are applied to a transmission line in accordance with the a-c losses of that line so as to establish the same system losses for transmission lines of differing lengths and gauges. For impedance simulating type circuits, circuitry can be provided which automatically varies the magnitude of the impedance simulating voltages and currents which are applied to a transmission line in accordance with the a-c losses of that line. For transmission lines of differing lengths and gauges, such circuitry is shown and described in U.S. Pat. No. 3,989,906 entitled "Repeater for Transmission Lines" which issued on Nov. 2, 1976 in the name of Frederick J. Kiko and also in U.S. Pat. No. 3,989,907 entitled "Repeater for Transmission Lines of Differing Lengths" which also issued on Nov. 2, 1976 in the name of Charles W. Chambers, Jr.

In telephone systems, it is often necessary to group combinations of line conditioning units so as to provide multiple functions. When, for example, an amplifier is to be located at a point along the length of a transmission line, it is often found that the impedance looking into the transmission line in one direction is substantially different from the impedance looking into the transmission line in the opposite direction. In the presence of an amplifying type repeater, this mismatch in line impedances can give rise to signal reflection and to less than complete transmission of signal power through the amplifier. Under these circumstances, the amplifiers are usually coupled to the transmission line through a pair of line build-out networks which match the impedances of the line looking towards each party. Prior to the present invention, the combination of line conditioning units which would provide both amplification and the desired impedance match required that these networks be coupled to the line through separate transformers so as to avoid interaction between the functions performed by each of the networks. When so connected, each line conditioning unit introduces into the transmission line a voltage and current which provides the desired effect.

It was then recognized that it would be far more desirable to introduce into the transmission line a single voltage in series with the line and a single current in shunt with the line which voltage and current affect the transmission characteristics of the line in a manner identical to the manner in which the characteristics of the line are affected by the introduction into the line of a multiplicity of series voltages and shunt currents, however, no technique or circuit was known which would produce these results.

In accordance with the present invention, there is provided circuitry which allows the insertion into a transmission line of a single voltage and a single current which voltage and current affect the transmission characteristics of the line in a multiplicity of independent non-interactive respects simultaneously. In addition thereto, such voltages and/or currents may also vary as a function of the a-c losses of the transmission line so as to allow lines of differing gauges and lengths to be grouped together in a common mode configuration.

SUMMARY OF THE INVENTION

In accordance with the present invention, a multiplicity of independent non-interactive effects can simultaneously be produced in the transmission characteristics of a telephone transmission line by providing a line conditioning apparatus which generates a single voltage for insertion in series with the line and a single current for insertion in shunt with the line.

More particularly, the apparatus comprises input and output voltage and current signal processing circuitry and a multiplicity of line conditioning control units. The output voltage signal processing circuitry has a multiplicity of voltage inputs and a multiplicity of feedback outputs and generates the voltage to be inserted in series with the transmission line, which is a function of the voltages at the inputs, and a multiplicity of feedback voltages. The feedback voltages are predetermined functions of the voltages at the inputs to the output voltage signal processing circuitry. The output current signal processing circuitry has a multiplicity of inputs and a multiplicity of feedback outputs and generates the current to be inserted in shunt with the transmission line, which is a function of the currents at the inputs, and a multiplicity of feedback currents. The feedback currents are predetermined functions of the currents at the inputs of the output current signal processing circuitry.

The input voltage signal processing circuitry senses the signal voltage across the transmission line and the multiplicity of feedback voltages and generates a multiplicity of output voltages in response thereto. The input current signal processing circuitry senses the signal current through the transmission line and the multiplicity of feedback currents and generates a multiplicity of output currents in response thereto. It is the multiplicity of feedback voltages and feedback currents which allows the present invention to simultaneously produce a multiplicity of independent non-interactive effects to thereby improve the transmission characteristics of the line.

The multiplicity of line conditioning control units, which are adapted to afford gain and/or impedance simulation in the transmission line, respond to the output voltages and output currents of the input voltage and input current signal processing circuits, respectively. Each of the conditioning control units has at least one input associated with a respective one of the outputs of the input signal processing circuitry and at least one output associated with a respective one of the inputs of the output signal processing circuitry.

DESCRIPTION OF THE DRAWING

FIGS. 2a and 2b illustrate equivalent circuits of the embodiment shown in FIG. 1.

FIGS. 3a and 3b show the input and output impedance and insertion gain equations associated with the embodiment of FIG. 1 and the equivalent circuits of FIGS. 2a and 2b.

FIGS. 4a and 4b show detailed and alternative circuit schematics for the input voltage and current signal processing means, and for the output voltage and current signal processing means of the embodiment of FIG. 1.

DESCRIPTION OF THE PREFERRED EMBODIMENT

Figure 1:
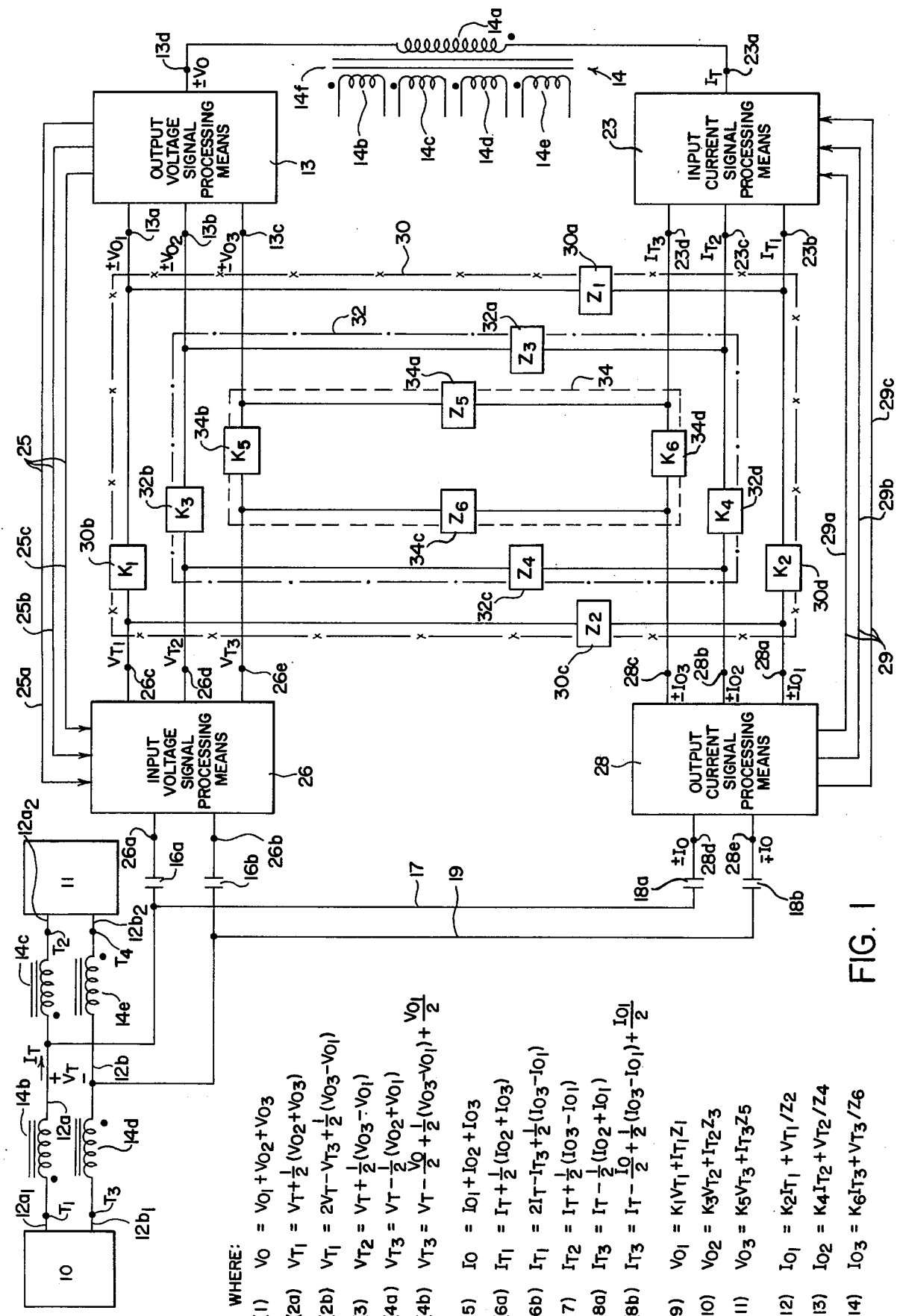
FIG. 1 is a combined block-schematic diagram which illustrates one embodiment of the invention.

Referring to FIG. 1, there is shown a transmitting-receiving station 10 for transmitting signals to and receiving signals from a transmitting-receiving station 11 through the conductors $12a_1$–$12a_2$ and $12b_1$–$12b_2$ of a two-wire transmission line. Stations 10 and 11 may, for example, comprise telephone sets which are connected through the conductors of a two-wire telephone line.

To the end that there may be introduced in series with the transmission line a line conditioning voltage, there is provided output voltage signal processing means 13 having input terminals 13a, 13b and 13c and an output terminal 13d. The voltage generated by processing means 13 appears at output 13d thereof and is applied in series with line conductors 12a and 12b through voltage output coupling or connecting means which here takes the form of transformer 14 having a primary winding 14a and secondary windings 14b, 14c, 14d and 14e which may be located on a common core 14f. In the present embodiment, it is contemplated that secondary windings 14b, 14c, 14d and 14e have substantially equal numbers of turn. This equality of turns assures that a desired voltage is introduced into the transmission line, between the terminal pairs $T_1$-$T_2$ and $T_3$-$T_4$ of the circuit of the invention, in four substantially equal parts and thereby assures the maintenance of line balance before, during and after changes in the amplitude of the line conditioning voltage. The voltage generated by signal processing means 13 affects transmission through the transmission line in the same manner as either a balanced series connected impedance (impedance simulating type line conditioning unit) or a balanced amplifying voltage which is in aiding relationship to the signal voltage transmitted by the then dominant or louder talking party and in opposing relationship to the then nondominant or softer talking party (amplifying type line conditioning unit) or any combination of the above line conditioning types as will be described hereinafter, depending upon the modifications desired to be introduced in the transmission characteristics of the line.

To the end that there may be introduced in shunt with the transmission line a line conditioning current, there is provided output current signal processing means 28 having input terminals 28a, 28b and 28c and output terminals 28d and 28e. The current generated by processing means 28 appears at output 28d and 28e thereof and is applied in shunt with line conductors 12a and 12b through output coupling means which here takes the form of conductors 17 and 19 and capacitors 18a and 18b. In the present embodiment, it is contemplated that the current in conductors 17 and 19 be substantially equal in magnitude but opposite in sign. This condition assures that substantially equal but opposite line conditioning currents are introduced in conductor pairs $12a_1$-$12a_2$ and $12b_1$-$12b_2$ and thereby assures maintenance of line balance before, during and after changes in the amplitude of the line conditioning current. The current generated by signal processing means 28 affects transmission through the transmission line in the same manner as either a shunt connected impedance (impedance simulating line conditioning unit) or an amplifying current which is in aiding relationship to the signal current transmitted by the then dominant or louder talking party and in opposing relationship to the then nondominant or softer talking party (amplifying type line conditioning unit) or any combination of the above line conditioning units as will be described hereinafter, depending upon the modifications desired to be introduced in the transmission characteristics of the line.

For amplifying type LCU's, the line conditioning voltage introduced in series with transmission line conductors 12a and 12b must vary as a function of the signal voltage across the transmission line, whereas the line conditioning current introduced in shunt with line conductors 12a and 12b must vary as a function of the signal current through the transmission line. For impedance simulating type LCU's, the line conditioning voltage introduced in series with line conductors 12a and 12b must have a magnitude which varies as a function of the signal current through the transmission line, whereas the line conditioning current introduced in shunt with line conductors 12a and 12b must have a magnitude which varies as a function of the signal voltage across the transmission line. To this end, there is provided input voltage signal processing means 26 having inputs 26a and 26b and outputs 26c, 26d and 26e. Similarly, there is provided input current signal processing means 23 having input 23a and outputs 23b, 23c and 23d. In addition, for reasons to be explained more fully presently, predetermined portions of the voltage generated by output processing means 13 are fed back over conductors 25a, 25b and 25c to input processing means 26. Similarly, predetermined portions of the current generated by output processing means 28 are fed back over conductors 29a, 29b and 29c to input processing means 23.

In order to affect and thereby improve the transmission characteristics of a telephone transmission line in a manner which is equivalent to the modifications provided by both amplifying type and impedance simulating type LCU's, processing means 26 has its outputs 26c, 26d and 26e connected through series gain control devices $30b(K_1)$, $32b(K_3)$ and $34b(K_5)$ respectively to inputs 13a, 13b and 13c of processing means 13 and through shunt impedance simulating control devices $30c(Z_2)$, $32c(Z_4)$ and $34c(Z_6)$ respectively to inputs 28a, 28b and 28c of processing means 28. Similarly, in order to affect and thereby improve the transmission characteristics of line conductors 12a and 12b in a manner equivalent to the modifications provided by both amplifying type LCU's and impedance simulating type LCU's processing means 23 has its outputs 23b, 23c and 23d connected through series impedance simulating control devices $30a(Z_1)$, $32a(Z_3)$ and $34a(Z_5)$ respectively, to inputs 13a, 13b and 13c of processing means 13 and through shunt gain control devices 30d ($K_2$), 32d ($K_4$) and 34d ($K_6$) respectively, to inputs 28a, 28b and 28c of processing means 28.

In particular, output 26c of processing means 26 is connected to input 13a of processing means 13 through gain control device $K_1$. This gain control device may be either resistive, capacitive or inductive or any combination of these elements and results in a voltage which is inserted in series with line conductors 12a and 12b to thereby affect signal transmission through the transmission line. The inserted voltage is in effect the superposition of two voltages, one of which is controlled by station 10 and the other of which is controlled by station 11. In addition, output 26c of processing means 26 is connected to input 28a of processing means 28 through impedance simulating control device $Z_2$, which may be either resistive, capacitive or inductive or any combination of these elements depending upon the type of impedance that is desired to be simulated in shunt with transmission line conductors 12a and 12b.

Input processor 23 has output terminal 23b connected through gain control device $K_2$ to input terminal 28a of output processor 28. Gain control device $K_2$ which may be of similar circuit structure as device $K_1$ results in a current which is inserted in shunt with transmission line conductors 12a and 12b to thereby affect signal transmission through the transmission line. The inserted current is in effect the superposition of two currents, one of which is controlled by station 10 and the other of which is controlled by station 11. Output 23b of processing means 23 is also coupled through impedance simulating control device $Z_1$ to input 13a of processing means 13. Control device $Z_1$ may be either resistive, capacitive or inductive or any combination of elements depending upon the impedance to be simulated in series with transmission line conductors 12a and 12b.

Voltage and current gain control devices $K_1$ and $K_2$, and series and shunt impedance simulating control devices $Z_1$ and $Z_2$ form a first line conditioning control means designated as 30 of FIG. 1. Control means 30 may, in the general case include gain control devices $K_1$ and $K_2$ and impedance simulating control devices $Z_1$ and $Z_2$, or in specific cases include less than all of devices $K_1$, $K_2$, $Z_1$ and $Z_2$. In all cases, however, control means 30 is whatever is connected to output terminal 26c of processing means 26, output terminal 23b of processing means 23, input terminal 13a of processing means 13 and input terminal 28a of processing means 28.

In a similar manner gain control devices $K_3$ and $K_4$ and impedance simulating control devices $Z_3$ and $Z_4$ form a second line conditioning control means designated as 32 of FIG. 1. Control means 32 may, in the general case include gain control devices $K_3$ and $K_4$ and impedance simulating control devices $Z_3$ and $Z_4$, or in specific cases include less than all of devices $K_3$, $K_4$, $Z_3$ and $Z_4$. In all cases, however, control means 32 is whatever is connected to output terminal 26d of processing means 26, output terminal 23c of processing means 23, input terminal 13b of processing means 13 and input terminal 28b of processing means 28.

In addition, gain control devices $K_5$ and $K_6$ and impedance simulating control devices $Z_5$ and $Z_6$ form a third line conditioning control means designated as 34 of FIG. 1. Control means 34 may, in the general case include gain control devices $K_5$ and $K_6$, impedance simulating control devices $Z_5$ and $Z_6$, or in specific cases include less than all of devices $K_5$, $K_6$, $Z_5$ and $Z_6$. In all cases, however, control means 36 is whatever is connected to output terminal 26e of processing means 23, input terminal 13c of processing means 13 and input terminal 28c of processing means 28.

Each of control means 30, 32, 34 taken in combination with processing networks 13, 26, 23 and 28 acts as if it were a separate and complete line conditioning unit, i.e. each of the three line conditioning units so formed by control means 30, 32 and 34, respectively, acts as if it were the only line conditioning unit affecting the transmission characteristics of the line. While for convenience the following discussion will refer to these three separate line conditioning units as if they were physically present, it will be understood that they are not actually present. Rather it is the physical line conditioning unit formed by the combination of control means 30, 32 and 34 with processing networks 13, 26, 23 and 28 which allows the characteristics of the line to be affected as if they were. Thus, the circuit of the invention performs by a single composite LCU a multiplicity of simultaneous and independent operations on the transmission characteristics of the line without the necessity of having individual LCU's for each operation.

The voltages generated at output terminals 26c, 26d and 26e of processing means 26 are designated as $V_{T1}$, $V_{T2}$ and $V_{T3}$ respectively. The voltages appearing at the inputs 13a, 13b and 13c of processing means 13 are designated as $V_{01}$, $V_{02}$ and $V_{03}$, respectively. As these voltages may be either positive or negative, there is both a non-inverting and an inverting input terminal at processing means 13 for each voltage and at any one time (or condition) only one of the two inputs are used. The manner in which the non-inverting and inverting inputs are used will be described in connection with the exemplary embodiments of FIGS. 5 and 6. For ease of illustration only one such input terminal is shown for each of inputs 13a, 13b and 13c. The voltage at output 13d of processing means 13 is designated as $V_0$ and, as shown in equation 1 (FIG. 1), is the sum of voltages $V_{01}$, $V_{02}$ and $V_{03}$. Voltage $V_0$ is introduced in series with transmission line conductors 12a and 12b through transformer 14. As will be described below presently, predetermined combinations of the voltages $V_{01}$, $V_{02}$ and $V_{03}$ are fed back from output processing means 13 to input processing means 26. As a result of this feedback, the voltage introduced in series with the transmission line by the circuit of the present invention, affects the characteristics of the line in substantially the same manner as the sum of the individual effects that would be provided by each of the three line conditioners i.e., the line conditioners including control means 30, 32, 34 if their output voltages were each connected to the line through a respective transformer.

The currents generated at output terminals 23b, 23c and 23d of processing means 23 are designated as $I_{T1}$, $I_{T2}$ and $I_{T3}$, respectively. The currents appearing at inputs 28a, 28b and 28c of output processing means 28 are designated at $I_{01}$, $I_{02}$ and $I_{03}$, respectively. As these currents may be either positive or negative, there is both a non-inverting and an inverting input terminal at processing means 28 for each current and at any one time (or condition) only one of the two inputs are used. The manner in which the non-inverting and inverting inputs are used will be described in connection with the exemplary embodiments of FIGS. 5 and 6. For ease of illustration only one such input terminal is shown for each of inputs 28a, 28b and 28c. The current at outputs 28d and 28e of processing means 28 is designated as $I_0$ and as shown in equation 5 (FIG. 1) is the sum of currents $I_{01}$, $I_{02}$ and $I_{03}$. Current $I_0$ is introduced in shunt with transmission line conductors 12a and 12b. As will be described below, predetermined combinations of the currents $I_{01}$, $I_{02}$ and $I_{03}$ are fed back from processing means 28 to input processing means 23. As a result of this feedback the current introduced in shunt with the transmission line by the circuit of the present invention, affects the characteristics of the line in substantially the same manner as the sum of the individual effects that would be provided by each of the three line conditioners, i.e., the line conditioners including control means 30, 32, 34 if their output currents were each connected to the line through respective connecting means.

The voltages $V_{T1}$, $V_{T2}$ and $V_{T3}$ which are the input voltages to circuits 30, 32 and 34, respectively, are related to the signal voltage $V_T$ in the transmission line, the voltage $V_0$ and the output voltages $V_{01}$, $V_{02}$ and $V_{03}$ of circuits 30, 32 and 34, respectively. As described previously, the voltage $V_0$ is the sum of the voltages $V_{01}$, $V_{02}$ and $V_{03}$. These relationships are given in equations two through four respectively (FIG. 1). To the end that a multiplicity of non-interactive simultaneous effects can be produced in the characteristics of the line, predetermined combinations of the voltages $V_{01}$, $V_{02}$ and $V_{03}$ are fed back from the processing means 13 over feedback paths 25a, 25b and 25c to be combined at voltage processing means 26 with the signal voltage $V_T$ to thereby generate $V_{T1}$, $V_{T2}$ and $V_3$. The alternative relationships given for $V_{T1}$ (Equations 2a and 2b) and for $V_{T3}$ (Equations 4a and 4b) allow for different combinations of voltages to be fed back from processing means 13. These different combinations are described in detail in connection with FIGS. 4a and 4b. Thus, the voltages $V_{T1}$, $V_{T2}$ and $V_{T3}$ are related to the transmission line voltage, $V_T$, as modified by the three feedback voltages derived from voltages $V_{01}$, $V_{02}$ and $V_{03}$.

The currents $I_{T1}$, $I_{T2}$ and $I_{T3}$ which are the input currents to circuits 30, 32 and 34 respectively are related to the signal current in the transmission line, $I_T$, the current $I_0$ and the output currents $I_{01}$, $I_{02}$, $I_{03}$ of circuits 30, 32 and 34, respectively. As described previously the current $I_0$ is the sum of the currents $I_{01}$, $I_{02}$ and $I_{03}$. These relationships are given in equations 6 through 8 respectively (see FIG. 1). To the end that a multiplicity of non-interactive simultaneous effects can be produced in the characteristics of the line, predetermined combinations of the currents $I_0$, $I_{01}$, $I_{02}$ and $I_{03}$ are fed back from the current processing means 28 over feedback paths 29a, 29b and 29c to be combined at processing means 23 with the signal current $I_T$ to thereby generate $I_{T1}$, $I_{T2}$ and $I_{T3}$. The alternative relationships given for $I_{T1}$ (Equations 6a and 6B) and $I_{T3}$ (Equations 8a and 8b) allow for different combinations of current to be fed back from processing means 28. These different combinations are described in detail in connection with FIGS. 4a and 4b. Thus, the currents $I_{T1}$, $I_{T2}$ and $I_{T3}$ are related to the transmission line current $I_T$ as modified by the three feedback currents derived from currents $I_{01}$, $I_{02}$ and $I_{03}$.

The voltage $V_{01}$ at input 13a of processor 13 is related by gain control device $K_1$ to the voltage $V_{T1}$ at output 26c of processor 26 and by impedance simulating control device $Z_1$, to the current $I_{T1}$ at output terminal 23b of processor 23. In a similar fashion, the voltages $V_{02}$ and $V_{03}$ at inputs 13b and 13c, respectively, of processor 13 are related by their associated gain and impedance simulating control devices to the voltages and currents $V_{T2}$ and $I_{T2}$, and $V_{T3}$ and $I_{T3}$, respectively. The relationship of the voltages $V_{01}$, $V_{02}$ and $V_{03}$ to the voltages $V_{T1}$, $V_{T2}$ $V_{T3}$ and the currents $I_{T1}$, $I_{T2}$ and $I_{T3}$ as a function of the devices $K_1$ and $Z_1$, $K_3$ and $Z_3$, and $K_5$ and $Z_5$, respectively, are given in Equations 9, 10 and 11, respectively of FIG. 1.

The current $I_{01}$ at input 28a of processor 28 is related to the current $I_{T1}$ at output 23b of processor 23 by gain control device $K_2$ and to the voltage $V_{T1}$ at output 26c of processor 26 by the impedance simulating control device $Z_2$. In a similar fashion, the currents $I_{02}$ and $I_{03}$ at inputs 28b and 28c respectively, of processor 28, are related by their associated gain and impedance simulating control devices to the voltages and currents $V_{T2}$ and $I_{T2}$ and $V_{T3}$ and $I_{T3}$, respectively. The relationship of the currents $I_{01}$, $I_{02}$ and $I_{03}$ at the inputs to processor 28 to the voltages $V_{T1}$, $V_{T2}$ and $V_{T3}$ and the currents $I_{T1}$, $I_{T2}$ and $I_{T3}$ as a function of the devices $K_2$ and $Z_2$, $K_4$ and $Z_4$, and $K_6$ and $Z_6$, respectively, are given in equations 12, 13, 14, respectively, of FIG. 1.

Referring to FIG. 2a, there is illustrated the effective result of the utilization of the embodiment of the invention shown in FIG. 1. This circuit shows that the three physically overlapped or nested line conditioning circuits including conditioning control circuits 30, 32 and 34 and their associated portions of the input processing means 26, 23 and the output current processing means 13, 28 including feedback paths 25 and 29, can be represented by three effective non-interactive line conditioning networks 36, 38 and 40 respectively. Each of the networks 36, 38 and 40 generates in series with the transmission line, voltages $V_{01}$, $V_{02}$ and $V_{03}$, respectively, and generates in shunt with the transmission line, currents $I_{01}$ and $I_{02}$ and $I_{03}$, respectively. While the following discussion will for convenience refer to line conditioning networks 36, 38 and 40 as if they were present, it will be understood that they are not actually present, but that the circuit of the invention allows the line to be affected as if they were.

In accordance with Equations 1 and 4, the embodiment of FIG. 1 introduces in series with the transmission line a voltage $V_0$ which is the sum of the voltages $V_{01}$, $V_{02}$ and $V_{03}$ and introduces in shunt with the transmission line a current $I_0$ which is the sum of the current $I_{01}$, $I_{02}$ and $I_{03}$. Thus, the affect on the transmission line characteristics provided by the embodiment of FIG. 1 can be envisioned as the sum of the effects provided by the conceptually separate networks of FIG. 2a.

In addition to modifying the characteristics of the transmission line, the embodiment of FIG. 1 also affects the impedances presented by the transmission line as will be described below. The impedance of the transmission line looking from the circuit of the invention towards station 10, is $Z_{10}$ and the impedance looking from the circuit of the invention towards station 11, is $Z_{11}$. The transformations provided to the impedances presented by the transmission line by each of the effective non-interactive line conditioning networks 36, 38 and 40 is illustrated in FIG. 2a. The transformed impedances of the transmission line as seen through the left and right-hand terminal pairs (postscripted by the letters x and y, respectively) of each of networks 36, 38 and 40, looking in the direction of the arrows, are related to the impedances $Z_{10}$ and $Z_{11}$ respectively by mathematical relationships to be described shortly.

Network 36 transforms the impedance $Z_{10}$ seen at terminal pair 36x so that an impedance $Z_{10/1}$ appears at terminal pair 36y. This transformed impedance is, in turn, acted upon by network 38 such that, at the right-hand terminal pair 38y of network 38, a transformed impedance $Z_{10/12}$ appears. The impedance $Z_{10/12}$ is then transformed by network 40 to appear at the right-hand terminal pair 40y of network 40 as an impedance $Z_{10/123}$. Thus, in a series of successive impedance transformations, the circuit of the invention transforms the impedance $Z_{10}$ presented by the transmission line at station 11, the overall effective impedance transformation being a function of the effective transformations provided by each of the effective networks produced by circuit of the invention.

Network 40 transforms the impedance $Z_{11}$ seen at terminal pair 40y so that an impedance $Z_{11/13}$ appears at its left-hand terminal pair 40x. This transformed impedance is in turn acted upon by network 38 such that a transformed impedance $Z_{11/23}$ appears at the left-hand terminal pair 38x of network 38. The impedance $Z_{11/23}$ is then transformed by network 36 to appear as an impedance $Z_{11/123}$ at the left-hand terminal pair 36x of network 36. Thus, in a series of successive impedance transformations, the circuit of the invention transforms the impedance $Z_{11}$ (which is presented by the transmission line at station 11), to a value equal to the impedance presented by the transmission line at station 10, the overall effective impedance transformation being a function of the effective transformations provided by each of the effective networks comprising the circuit of the invention.

FIG. 2a has illustrated the effective result of the utilization of the trisection embodiment of the invention shown in FIG. 1. As will be described later in connection with FIG. 8 one of the line conditioning control circuits 30, 32 or 34 can be removed to provide an effective bisection embodiment of the invention.

FIG. 2b illustrates a single circuit 42 which has the same effect upon the line as the combined effects of conceptually separate line conditioning networks 36, 38 and 40 or, stated differently, the same effect as the combined effect of processing means 13, 26, 23, 28, line conditioning control means 30, 32 and 34 and feedback conductors 25 and 29. Like the conceptually separate networks 36, 38 and 40, network 42 generates in series with the transmission line a voltage $V_0$ which is the sum of the voltages $V_{01}$, $V_{02}$ and $V_{03}$ and in shunt with the transmission line a current $I_0$ which is the sum of the current $I_{01}$, $I_{02}$ and $I_{03}$. In addition, like separate networks 36, 38 and 40, network 42 transforms the impedance $Z_{10}$ such that an impedance $Z_{10/123}$ appears at its right-hand terminal pair 42y. Network 42 also transforms the impedance $Z_{11}$ such that an impedance $Z_{11/123}$ appears at its left-hand terminal pair 42x. Thus, the embodiment of FIG. 1 can be considered as being either three individual networks which combine to modify the characteristics of the transmission line or as a single network which modifies the characteristics of the transmission line in the same manner as the combination of the three conceptually separate networks 36, 38 and 40.

Referring to FIG. 3, there are given equations 15 and 18 which mathematically describe the impedances $Z_{11/123}$ and $Z_{10/123}$ which result from the impedance tranformations provided by the circuit of the invention to the impedances presented by the transmission line at stations 11 and 10, respectively. From equations 15 and 18, it can be seen that the impedances $Z_{11/123}$ and $Z_{10/123}$ are functions of the impedances of gain control devices (K1 through K6) and the impedances of the impedance control devices (Z1 through Z6) included within line conditoning control circuits 30, 32 and 34 of FIG. 1. In particular, the impedances $Z_{11/123}$ and $Z_{10/123}$ are equal to the impedances $Z_{11}$ and $Z_{10}$, respectively, times the product of the impedance transformations provided by each of conceptually separate circuits 36, 38 and 40 of FIG. 2a. This product relationship results from the non-interactiveness imparted to circuits 36, 38 and 40 by the feedback connections between input and output processors 13 and 26 and input processors 23 and 28.

Equations 17 and 20 mathematically describe the insertion gains $G_{10/11}$ and $G_{11/10}$ which result from the utilization of the circuitry of the invention when stations 10 and 11, respectively, are the dominate transmitters i.e., louder talkers, loudness being considered on a syllabic basis as described in U.S. Pat. No. 3,706,862. The insertion gain is defined as the increase in power level at the receiving terminal of a transmission system caused by the insertion of a device into the system. In particular, it is the ratio of power delivered to the part of the system following the device, to the power delivered to the same part before insertion of the device. In the double subscript notation utilized herein for the insertion gains, the first subscript identifies the dominant station and the second subscript identifies the receiver at which the reception level is being measured. Thus, $G_{10/11}$ indicates that station 10 is dominant and the level of reception at station 11 is under consideration. From equations 17 and 20 it can be seen that the insertion gains $G_{10/11}$ and $G_{11/10}$ are functions of values of the components included within line conditioning control means 30, 32 and 34 of FIG. 1. In particular, the insertion gains $G_{10/11}$ and $G_{11/10}$ are equal to the product of the insertion gains provided by each of the conceptually separate line conditioning circuits 36, 38 and 40. This product relationship results from the non-interactiveness imparted to circuits 36, 38 and 40 by the feedback connections between input and output voltage processing means 13 and 26 and input and output current processing means 23 and 28.

Equations 16a and 16b of FIG. 3 define the terms $Z_{11/3}$ and $Z_{11/23}$, respectively, which terms are utilized in equations 15 and 17. Equations 19a and 19b define the terms $Z_{10/1}$ and $Z_{10/12}$, respectively, which terms are utilized in equations 18 and 20. The directions in which impedances $Z_{10/1}$, $Z_{10/12}$, $Z_{10/3}$ and $Z_{11/23}$ are measured are shown in FIG. 2a, described previously.

Figure 4A:
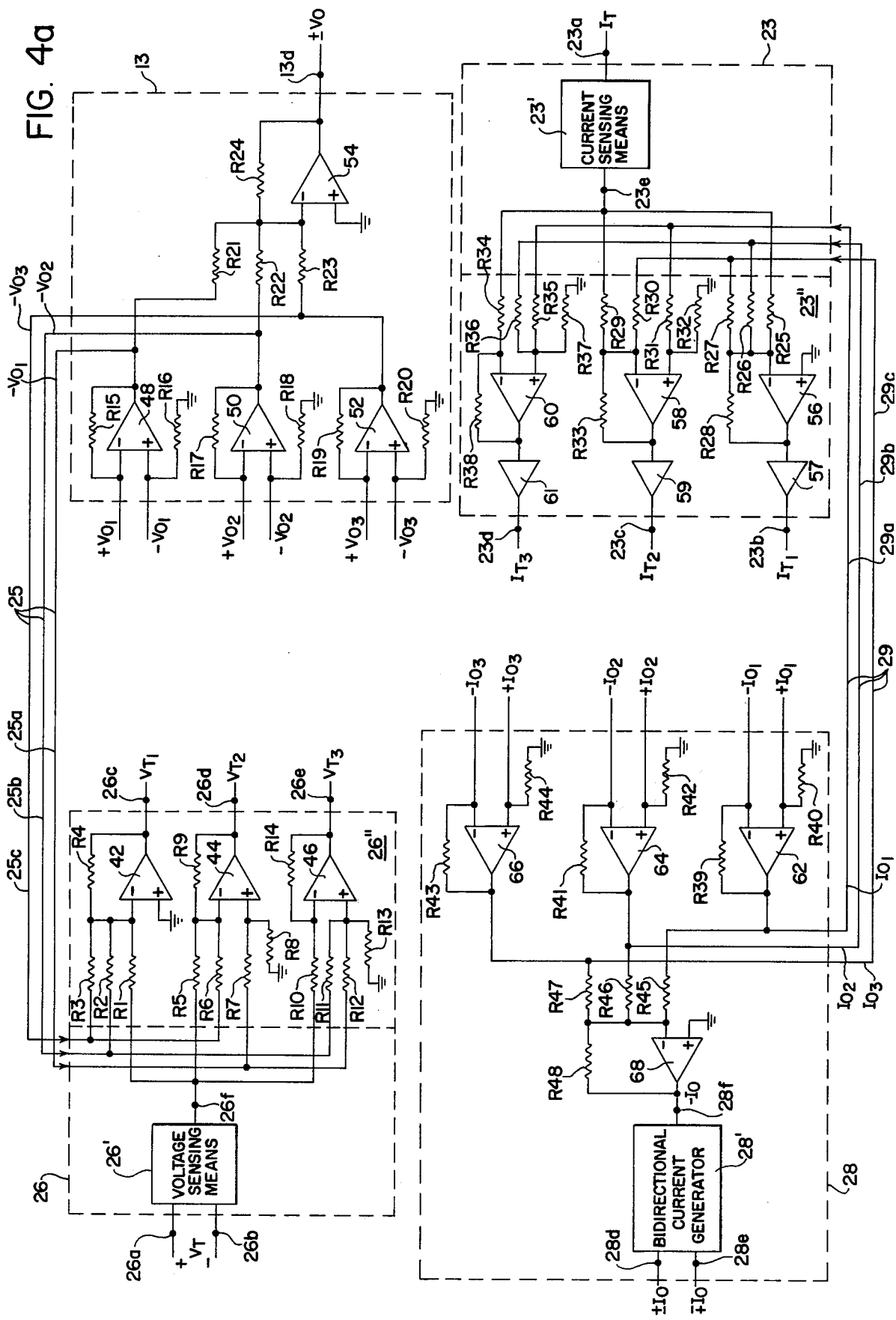
Figure 4B:
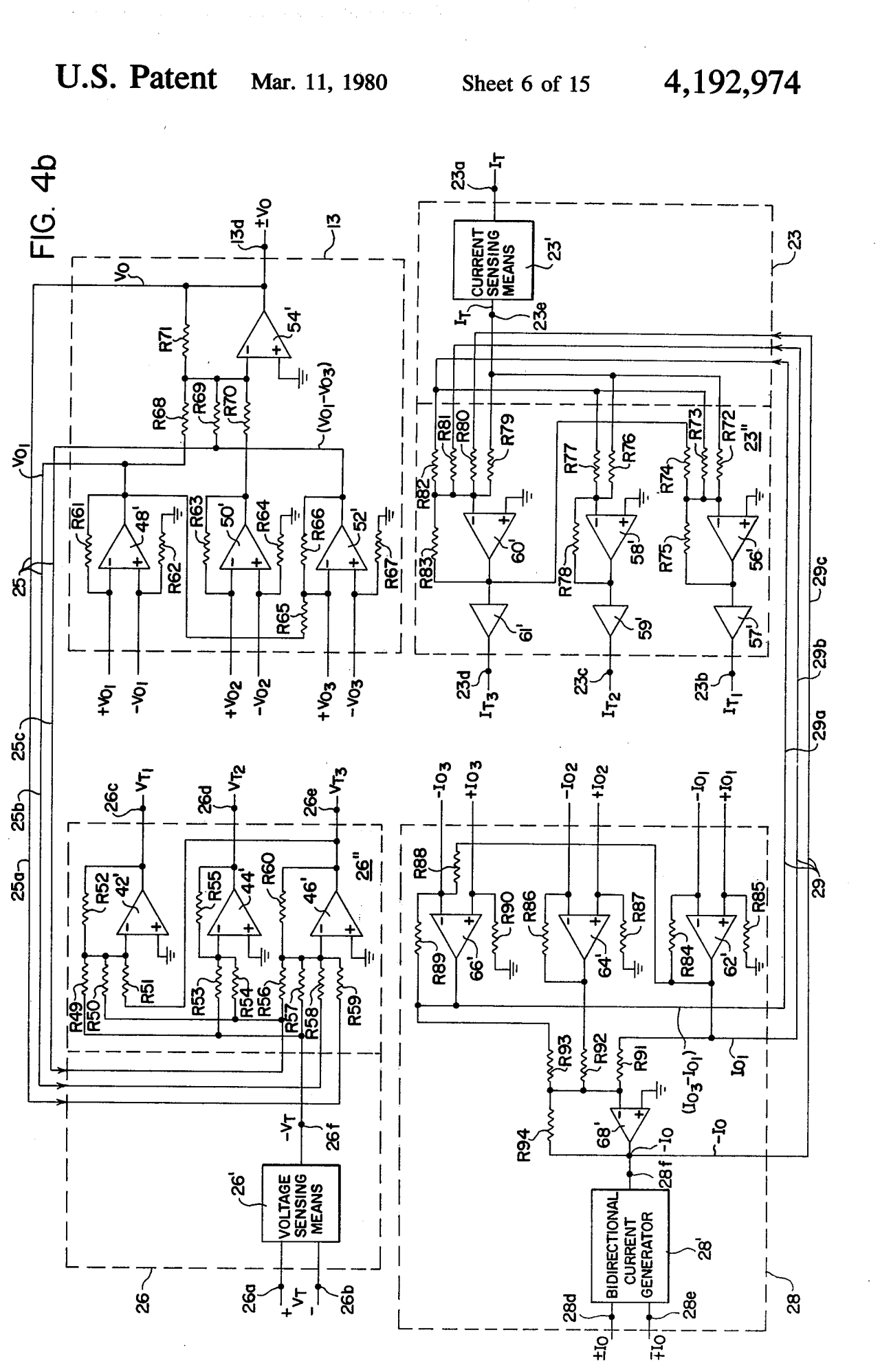

Referring to FIGS. 4a and 4b, there are shown alternative circuit schematics for the input voltage and current processing means 26 and 23, respectively, and output voltage and current processing means, 13 and 28, respectively, of the embodiment of FIG. 1. FIG. 4a shows the circuit schematic associated with Equations 2(a), 3, 4(a) for the voltages $V_{T1}$, $V_{T2}$ and $V_{T3}$, respectively, and Equations 6(a), 7 and 8(a) for the currents $I_{T1}$, $I_{T2}$ and $I_{T3}$, respectively, of FIG. 1. In both FIGS. 4a and 4b, processing means 26 is shown to include voltage sensing means 26' and voltage generating means 26'', and processing means 23 is shown to include current sensing means 23' and current generating means 23''.

In the alternative circuit schematics of FIGS. 4a and 4b the two voltage sensing means labeled 26' each having inputs 26a and 26b and an output 26f, are identical. Voltage sensing means 26' serves to sense the signal voltage across the transmission line and to control the potential between output 26f thereof and the circuit common or ground in accordance therewith. More specifically, voltage sensing means 26' causes the voltage at output 26f thereof to vary negatively and positively with respect to ground when the signal voltage across the transmission line drives input 26a thereof positively and negatively, respectively, from input 26b thereof. In general the voltage at output 26f of sensing means 26' has a magnitude which is proportional to the signal voltage across the transmission line. For ease of description, it is hereinafter assumed for both FIGS. 4a and 4b that the voltage generated at output 26f of sensing means 26' is $-V_T$, a negative constant of unity times the transmission line signal voltage. Voltage sensing means of any suitable design having a high input impedance between terminals 26a and 26b and a low output impedance between output 26f and ground, such as an operational amplifier, may be used.

In the alternative circuit schematics of FIGS. 4a and 4b the two current sensing means labeled 23', each having an input 23a and an output 23e, are identical. Current sensing means 23' serves to sense the signal current through the transmission line and to control the potential between output 23e and ground in accordance therewith. More specifically, sensing means 23' causes the voltage at output 23e thereof to vary positively and negatively with respect to ground when the signal current in the transmission line drives current respectively into and out of input 23a thereof. For ease of description, it is hereinafter assumed for both FIGS. 4a and 4b that the voltage at output 23e of sensing means 26' has the same sign as and a magnitude which is proportional to the transmission line signal current. Current sensing means of any suitable design having a low input impedance between input 23a thereof and ground and a low output impedance between output 23e thereof and ground, such as an operational amplifier, may be used.

In the alternative circuit schematic of FIGS. 4a and 4b, bidirectional current generating means labeled 28', each having an input 28f and outputs 28d and 28e, are identical. Current generating means 28' serves to generate from the current $-I_0$ at input 28f thereof, equal and opposite currents $\pm I_0$ and $\mp I_0$ at outputs 28d and 28e, respectively. This condition assures that substantially equal but opposite currents are introduced into conductor pairs $12a_1$—$12a_2$ and $12b_1$—$12b_2$ and thereby assures the maintenance of line balance before, during and after changes in the amplitude of the current. Current generating means of any suitable design which generate equal but opposite output currents from an input current may be used. One such current generating means is shown and described in U.S. Pat. No. 3,870,896 granted in the name of F. Kiko on Mar. 11, 1975.

FIG. 4a will now be described.

To the end that the voltages $V_{T1}$, $V_{T2}$ and $V_{T3}$, described previously in connection with Equations 2, 3 and 4 of FIG. 1, may be generated, input processing means 26 includes voltage sensing means 26' and voltage generating means 26''. As described previously, sensing means 26' serves to sense the transmission line signal voltage, $V_T$, and generate at output 26f thereof a voltage, $-V_T$. Voltage generating means 26'' serves to generate in response to the voltage $-V_T$ and the voltages $-V_{01}$, $-V_{02}$ and $-V_{03}$ which voltages are fed back from output processing means 13 to input processing means 26 over conductors 25a, 25b and 25c, respectively, the voltages $V_{T1}$, $V_{T2}$ and $V_{T3}$. In particular, the operational amplifiers 42, 44 and 46 and their associated input and feedback resistors which comprise generating means 26'', represent the physical implementations of Equations 2(a), 3 and 4(a) for the voltages $V_{T1}$, $V_{T2}$ and $V_{T3}$. The resistance value of each operational amplifier's input resistors are chosen in relation to the resistance of the associated feedback resistor in order to satisfy the mathematical expression given in FIG. 1 for the output voltage generated by that amplifier.

For example, amplifier 42 which generates the voltage $V_{T1}$ has its inverting or negative input terminal coupled through resistors R1, R2 and R3 to the voltages $-V_T$, $-V_{02}$ and $-V_{03}$, respectively. A feedback resistor R4 is coupled between the inverting input terminal and the output terminal of amplifier 42. The non-inverting or positive input terminal of amplifier 42 is connected to ground. The voltage $V_{T1}$ at the output of amplifier 42 is related to the inverted sum of the input voltages. Resistance values for input resistors R1, R2 and R3 are chosen in relation to the resistance of feedback resistor R4 in order to satisfy the expression for $V_{T1}$ (Equation 2a). Thus, resistors R1 and R4 have resistances in the ratio of 1 to 1 whereas resistors R2 and R3 have resistances which are each related to the resistance of R4 in the ratio of 2 to 1.

Amplifier 44 which generates the voltage $V_{T2}$, has its inverting input terminal coupled through resistors R5 and R6 to the voltages $-V_T$ and $-V_{03}$, respectively, and its non-inverting input terminal coupled through resistors R7 and R8 to the voltage $-V_{01}$ and ground respectively. The voltage $V_{T2}$ is related to the inverted sum of the input voltages $-V_T$ and $-V_{03}$ added to the input voltage $-V_{01}$. In a manner similar to that described above for the input resistors of amplifier 42, the input resistors R5, R6 of amplifier 44 have resistance values which are chosen in relation to the resistance of feedback resistor R9 in order to satisfy the expression for $V_{T2}$ (Equation 3). The resistance value for input resistor R7 is chosen in relation to the resistance of resistor R8 in order to also satisfy equation 3. Thus, resistors R5 and R6 have resistances which are each related to the resistance of resistor R9 in the ratios of 1 to 1 and 2 to 1, respectively. Resistor R7 has a resistance which is related to the resistance of R8 in the ratio of 2 to 1.

Amplifier 46 which generates the voltage $V_{T3}$, has its inverting input terminal coupled through resistor R10 to the voltage $-V_T$ and its non-inverting input terminal coupled through resistors R11 and R12 to the voltages $-V_{01}$ and $-V_{02}$, respectively, and also to ground through resistor R13. The voltage $V_{T3}$ is related to the sum of the input voltages $-V_{01}$ and $-V_{02}$ added to the inverted voltage $V_T$. The resistance value for resistor R10 is chosen in relation to the resistance of resistor R14 in order to satisfy the expression for $V_{T3}$ (Equation 4a). Resistance values for resistors R11 and R12 are each chosen in relation to the resistance of resistor R13 in order to satisfy Equation 4a. Thus, resistor R10 and R14 have resistances in the ratio of 1 to 1 whereas resistors R11 and R12 have resistances which are each related to the resistance of resistor R13 in the ratio of 2 to 1.

To the end that the currents $I_{T1}$, $I_{T2}$ and $I_{T3}$, described previously in connection with Equations 6, 7 and 8 of FIG. 1, may be generated, input current processing means 23 includes a current sensing means 23' and current generating means 23''. As described previously, sensing means 23' serves to sense the transmission line signal current $I_T$, and generate at ouput 23e a voltage representative of the current $I_T$. Current generating means 23'' serves to generate, in response to the "current" $I_T$ and in response to the voltages representative of the currents $I_{01}$, $I_{02}$ and $I_{03}$, which currents are fed back from output processing means 28 to input processing means 23 over conductors 29a, 29b and 29c respectively, voltages representative of the currents $I_{T1}$, $I_{T2}$ and $I_{T3}$. For simplicity of description, the various voltages described above are labeled in FIG. 4a and will be referred to hereinafter by the currents which they represent.

In particular, the operational amplifiers 56, 58 and 60 and their associated inverting amplifiers 57, 59 and 61, together with the input and feedback resistors which comprise generating means 23'', represent the physical implementation of Equations 6(a), 7 and 8(a) for the currents $I_{T1}$, $I_{T2}$ and $I_{T3}$. Inverting amplifiers 57, 59, 61 provide an output current which is equal in magnitude and opposite in algebraic sign to the output current of the associated operational amplifier, to thereby provide the desired polarity for the current $I_{T1}$, $I_{T2}$, $I_{T3}$. Each inverting amplifier may, for example, be implemented as an operational amplifier having unity amplification where the signal desired to be inverted is connected to the amplifier's inverting input terminal and the non-inverting input terminal is connected to ground. The resistance value of each of the operational amplifier's 56, 58 and 60 input resistors are chosen in relation to the resistance of the associated feedback resistor in order to satisfy the mathematical expression given in FIG. 1, for the output current generated by that amplifier.

For example amplifier 56, which generates the current $I_{T1}$, has its inverting input terminal coupled through resistors R25, R26 and R27 to the currents $I_T$, $I_{02}$ and $I_{03}$. A feedback resistor R28 is coupled between the inverting input terminal and the output terminal of amplifier 56. The non-inverting input terminal is connected to ground. The output current $-I_{T1}$ at the output of the amplifier 56 is related to the inverted sum of the input currents. Inverting amplifier 57 inverts the current $-I_{T1}$, to provide the desired output current $+I_{T1}$. Values for the resistance of each of input resistors R25, R26 and R27 are chosen in relation to the resistance of feedback resistor R28 in order to satisfy the expression for $I_{T1}$ (Equation 6(a)). Thus, resistors R25 and R28 have resistances in the ratio of 1 to 1 whereas resistors R26 and R27 have resistances which are related to the resistance of R28 in the ratio of 2 to 1.

Amplifier 58 which generates the current $I_{T2}$, has its inverting input terminal coupled through resistors R29 and R30 to the currents $I_T$ and $I_{03}$ and its non-inverting input terminal coupled through resistors R31 and R32 to the current $I_{01}$ and ground. A feedback resistor R33 is coupled between the amplifier's inverting input terminal and its output terminal. The current $-I_{T2}$ at the output of amplifier 58 is related to the inverted sum of the input currents $I_T$ and $I_{03}$ added to the input current $I_{01}$. Inverting amplifier 59 inverts the current $I_{T2}$ to provide the desired output current $+I_{T2}$. Resistance values for the resistors R29 and R30 are chosen in relation to the resistance of feedback resistor R33 in order to satisfy the expression for $I_{T2}$ (Equation 7). The resistance value for input resistor R31 is chosen n relation to the resistance of resistor R32 in order to also satisfy Equation 7. Thus, resistors R29 and R30 have resistances which are related to the resistance of resistor R33 in the ratio of 1 to 1 and 2 to 1 respectively. Resistor R31 has a resistance which is related to the resistance of resistor R32 in the ratio of 2 to 1.

Amplifier 60 which generates the current $I_{T3}$, has its inverting input terminal coupled through resistor R34 to the current $I_T$ and its non-inverting input terminal coupled through resistors R35 and R36 to the currents $I_{01}$ and $I_{02}$ and through resistor R37 to ground. A feedback resistor R38 is coupled between the negative input terminal and the output terminal of amplifier 60. The current $I_{T3}$ at the output of amplifier 60 is related to the sum of the input currents $I_{01}$ and $I_{02}$ added to the inverted current $I_T$. Inverting amplifier 61 inverts the current $-I_{T3}$ to provide the desired output current $-I_{T3}$. The resistance of resistor R34 is chosen in relation to the resistance of resistor R38 in order to satisfy the expression for $I_{T3}$ (Equation 8a). Resistance values for resistors R35 and R36 are chosen in relation to the resistance of resistor R37 in order to also satisfy Equation 8a. Thus, resistors R34 and R38 have resistances in the ratio of 1 to 1 whereas resistors R35 and R36 have resistances which are each related to the resistance of resistor R37 in the ratio of 2 to 1.

To the end that the voltage $V_0$ (which was described previously in connection with Equation 1 of FIG. 1) may be generated, output voltage processing means 13 includes four operational amplifiers 48, 50, 52 and 54 and their associated input and feedback resistors. The input voltages of amplifiers 48, 50 and 52 are $V_{01}$, $V_{02}$ and $V_{03}$, respectively. These voltages as shown in Equations 9, 10, 11 are related to the output voltages $V_{T1}$, $V_{T2}$ and $V_{T3}$ of processing means 26 and the output currents $I_{T1}$, $I_{T2}$ and $I_{T3}$ of processing means 23 by the various gain and impedance control devices coupled between the outputs of processing means 26 and 23 and the associated inputs of processing means 13. For example, the voltage $V_{01}$ is related to the output voltage $V_{T1}$ of processing means 26 by the gain control device $K_1$ and to the output current $I_{T1}$ of processing means 23 by the impedance control device $Z_1$.

The output voltages of amplifiers 48, 50 and 52 are $-V_{01}$, $-V_{02}$ and $-V_{03}$. These voltages are fed back by conductors 25a, 25b and 25c, respectively, to input voltage processing means 26 to thereby generate the voltages $V_{T1}$, $V_{T2}$ and $V_{T3}$. The voltages $-V_{01}$, $-V_{02}$ and $-V_{03}$ are also coupled by resistors R21 R22 and R23 to the inverting input of amplifier 54. A feedback resistor R24 is connected between the amplifier's inverting input terminal and output terminal. The non-inverting input terminal of amplifier 54 is connected to ground. As a result, the voltage $V_0$ at the output of amplifier 54 is equal to the inverted sum of the input voltages. Resistance values for resistors R21, R22 and R23 are chosen in relation to the resistance of feedback resistor R24 in order to satisfy the expression for $V_0$ (Equation 1). Thus, resistors R21, R22 and R23 have resistances which are each related to the resistance of resistor R24 in the ratio of 1 to 1.

Amplifiers 48, 50 and 52 have their inverting input terminals connected to their output terminals by feedback resistors R15, R17 and R19, respectively. The non-inverting input terminal of each amplifier 48, 50 and 52 is connected to ground through resistors R16, R18 and R20, respectively. For each of amplifiers 48, 50 and 52 the voltages at the inverting input terminals are $V_{01}$, $V_{02}$ and $V_{03}$, respectively, and at the noninverting input terminals are $-V_{01}$, $-V_{02}$ and $-V_{03}$, respectively.

Thus, operational amplifiers 48, 50 and 52 generate (in response to the voltages $V_{T1}$, $V_{T2}$ and $V_{T3}$ and the currents $I_{T1}$, $I_{T2}$ and $I_{T3}$, as altered by the associated gain and impedance control devices) the voltages $-V_{01}$, $-V_{02}$ and $-V_{03}$ which are, in turn, fed back to processing means 26 to generate therein the voltages $V_{T1}$, $V_{T2}$ and $V_{T3}$ and are also combined by amplifier 54 to thereby generate the voltage $V_0$ for insertion in series with the transmission line. As a result of the feedback between processors 13 and 26, the voltage $V_0$, which voltage is related to the gain and impedance control devices that couple means 26, 23 to processor 13, affects the transmission characteristics of the line in a manner equivalent to the effects that would be provided if the voltages $V_{01}$, $V_{02}$ and $V_{03}$ were each simultaneously and independently inserted in the line.

To the end that the current $I_0$ described previously in connection with Equation 5 of FIG. 1 may be generated, output current processing means 28 includes four operational amplifiers 62, 64, 66 and 68, their assocatied input and feedback resistors and bidirectional current generator 28'. Although the inputs and outputs of each of amplfiers 62, 64, 66 and 68 are voltages representative of currents, for simplicity of description, these voltages will be labeled in FIG. 4a and referred to hereinafter by the currents they represent. The inputs current to amplifiers 62, 64 and 66 are $I_{01}$, $I_{02}$ and $I_{03}$, respectively. These currents as shown in Equations 12, 13, 14 are related to the output voltages $V_{T1}$, $V_{T2}$ and $V_{T3}$ of processing means 26 and the output currents $I_{T1}$, $I_{T2}$ and $I_{T3}$ of processing means 23 by the various impedance control and gain devices which are coupled between the outputs of processing means 26 and 23 and the associated inputs of processing means 28. For example, the current $I_{01}$ is related to the output current, $I_{T1}$ of processing means 23 by gain control device $K_2$ and to the output voltage $V_{T1}$ of processing means 26 by the impedance control device $Z_2$.

The output currents of amplifiers 62, 64 and 66 are $I_{01}$, $I_{02}$ and $I_{03}$. These currents are feedback by conductors 29a, 29b and 29c respectively, to input current processing means 23 to thereby generate the currents $I_{T1}$, $I_{T2}$ and $I_{T3}$. The currents $I_{01}$, $I_{02}$ and $I_{03}$ are also coupled by resistors R45, R46 and R47 to the inverting input of amplifier 68. A feedback resistor R48 is connected between the amplifier's inverting input terminal and output terminal. The non-inverting input terminal of amplifier 68 is connected to ground. The current $-I_0$ at the output of amplifier 68 is equal to the inverted sum of the input currents. Resistance values for resistors R45, R46 and R47 are chosen in relation to the resistance of feedback resistor R48 in order to satisfy the expression for $I_0$ (Equation 5). Thus, resistors R45, R46 and R47 have resistances which are related to the resistance of resistor R48 in the ratio of 1 to 1.

Amplifiers 62, 64 and 66 have their inverting input terminals connected to their associated output terminals by feedback resistors R39, R41 and R43, respectively. The noninverting input terminal of amplifiers 62, 64 and 66 are connected to ground through resistors R40, R42 and R44, respectively. For each of amplifiers 62, 64 and 66 the currents at the inverting input terminals thereof are $-I_{01}$, $-I_{02}$ and $-I_{03}$, respectively, and the currents at the non-inverting input terminals thereof are $I_{01}$, $I_{02}$ and $I_{03}$, respectively.

Thus, operational amplifiers 62, 64 and 66 generate the currents $I_{01}$, $I_{02}$ and $I_{03}$ in response to the currents $I_{T1}$, $I_{T2}$ and $I_{T3}$ and the voltages $V_{T1}$, $V_{T2}$, and $V_{T3}$, as altered by the associated gain and impedance control devices. These currents $I_{01}$, $I_{02}$ and $I_{03}$ are, in turn, fed back to processing means 23 to generate therein the currents $I_{T1}$, $I_{T2}$ and $I_{T3}$ and are also combined by amplifier 68 to thereby generate, in combination with current generator 28', the current $I_0$ for insertion in shunt with the transmission line. As a result of the feedback between processors 28 and 23, the current $I_0$ (which is related to the gain and impedance devices which couple processors 23 and 26 to processors 28), affects the transmission characteristics of the line in a manner equivalent to the effects that would be provided if the currents $I_{01}$, $I_{02}$ and $I_{03}$ were each simultaneously and independently inserted in the line.

FIG. 4b will now be described.

To the end that the voltages $V_{T1}$, $V_{T2}$ and $V_{T3}$ described previously in connection with Equations 2, 3 and 4 of FIG. 1, may be generated, input processing means 26 includes voltage sensing means 26' and voltage generating means 26''. As described previously, sensing means 26' serves to sense the transmission line signal voltage, $V_T$, and generate at output 26f thereof a voltage, $-V_T$. Voltage generating means 26'' serves to generate the voltages $V_{T1}$, $V_{T2}$ and $V_{T3}$ in response to the voltages $V_0$, $-V_{01}$ and ($V_{01} - V_{03}$) fed back from output processing means 13 to input processing means 26 over conductors 25a, 25b and 25c, respectively. In particular, operational amplifiers 42', 44' and 46' togetherwith their associated input and feedback resistors represent the physical implementation of Equation 2(b), 3 and 4(b) for the voltages $V_{T1}$, $V_{T2}$ and $V_{T3}$. The resistance value of each operational amplifier's input resistors are chosen in relation to the resistance of the associated feedback resistor in order to satisfy the mathematical expression given in FIG. 1 for the output voltage generated by that amplifier.

The feedback voltage ($V_{01} - V_{03}$) is connected to the inverting input terminal of each of amplifiers 42', 44' and 46' through the associated resistors R50, R54 and R56. The feedback voltages $-V_{01}$ and $V_0$ are connected to the inverting input terminal of amplifier 46' through the associated resistors R58 and R59, respectively.

Operational amplifiers 42', 44' and 46' operate in a manner similar to operational amplifiers 42, 44 and 46 described previously for FIG. 4a. The major difference between these two sets of amplifiers is that for amplifiers 42', 44' and 46' the input resistors R49, R50 and R51 for amplifier 42', the resistors R53, R54 for amplifier 44' and the resistors R56, R57 R58 and R59 for amplifier 46'are connected to the inverting terminals of their associated amplifiers and are sized in relation to their respective feedback resistors R52, R55 and R60 so that the voltages $V_{T1}$, $V_{T2}$ and $V_{T3}$ are generated in accordance with Equations 2b, 3 and 4b, respectively. The ratios of input resistance and feedback resistance for each of amplifiers 42', 44' and 46' are given in Table I below.

Table I

| Amplifier | Resistance Ratio |
| --- | --- |
| 42' | R49/R52 - ½:1 |
|  | R50/R52 - 2:1 |
|  | R51/R52 - 1:1 |
|  | R53/R55 - 1:1 |
| 44' | R54/R55 - 2:1 |
|  | R56/R60 - 2:1 |
|  | R57/R60 - 1:1 |
|  | R58/R60 - 2:1 |
| 46' | R59/R60 - 2:1 |

To the end that the circuit of the invention may generate the currents $I_{T1}$, $I_{T2}$ and $I_{T3}$, described previously in connection with Equations 6, 7 and 8 of FIG. 1, input current procession means 23 includes current sensing means 23' and current generating means 23''. As described previously, sensing means 23' serves to sense the transmission line signal current $I_T$, and generate at output 23e thereof a voltage representative of current $I_T$. Current generating means 23'' serves to generate voltages representative of the currents $I_{T1}$, $I_{T2}$ and $I_{T3}$ in response to the output voltage of sensing means 23'' and the voltage representative of the currents ($I_{03}-I_{01}$), $I_0$ and $-I_{01}$ fed back from output processing means 28 to input processing means 23 over conductors 29a, 29b and 29c, respectively. Inverting amplifiers 57', 59' and 61' which are included in means 23'' function in a manner identical to inverting amplifiers 57, 59 and 61 described previously for FIG. 4a. Each inverting amplifier may also be implemented in the form described previously for FIG. 4a. For simplicity of description, the various voltages described above will be labeled in FIG. 4b referred to hereinafter by the currents which they represents.

The feedback current ($I_{03} - I_{01}$) is connected to the inverting input terminal of each of amplifiers 56', 58' and 60' through the associated resistors R73, R77 and R82. The feedback currents $-I_0$ and $I_{01}$ are connected to the inverting input terminal of amplifier 60' through the associated resistors R80 and R81, respectively.

Amplifiers 56', 58' and 60' operate in a manner similar to operational amplifiers 56, 58 and 60 described previously in connection with FIG. 4a. The major differences between the two sets of amplifiers is that for amplifiers 56', 58' and 60' the input resistors R72, R73 and R74 for amplifier 56', the resistors R76 and R77 for amplifier 58' and the resistors R79, R80, R81 and R82 for amplifier 60' are connected to the inverting input terminals of their associated amplifiers and are sized in relation to their respective feedback resistors R75, R78 and R83 so that the currents $I_{T1}$, $I_{T2}$ and $I_{T3}$ are generated in accordance with equations 6b, 7 and 8b, respectively. The ratios of the input resistors and the feedback resistors for each of amplifiers 56', 58' and 60' are given in Table II below.

Table II

| Amplifier | Resistance Ratio |
|---|---|
|  | R72/R75 - ½:1 |
|  | R73/R75 - 2:1 |
| 56' | R74/R75 - 1:1 |
|  | R76/R78 - 1:1 |
| 58' | R77/R78 - 2:1 |
|  | R79/R83 - 1:1 |
|  | R80/R83 - 2:1 |
|  | R81/R83 - 2:1 |
| 60' | R82/R83 - 2:1 |

To the end that the voltage $V_0$ decribed previously in connection with Equation 1 of FIG. 1 may be generated, output voltage processing means 13 includes four operational amplifiers 48', 50', 52' and 54' and their associated input and feedback resistors.

The input voltages to each of amplifiers 48', 50' and 52' are $V_{01}$, $V_{02}$ and $V_{03}$, respectively. These voltages as shown in Equations 9, 10, 11 are related to the output voltages $V_{T1}$, $V_{T2}$ and $V_{T3}$ of processing means 26 and the output currents $I_{T1}$, $I_{T2}$ and $I_{T3}$ of processing means 23 by the various gain and impedance control devices coupled between the outputs of processing means 26 and 23 and the associated inputs of processing means 13. For example, the voltage $V_{01}$ is related to the output voltage $V_{T1}$ of processing means 26 by the gain control device $K_1$ to the current $I_{T1}$ of processing means 23 by the impedance control device $Z_1$.

The output voltages of amplifiers 48', 50' and 52' are $-V_{01}$, $-V_{02}$ and $(V_{01}-V_{03})$. The voltages $-V_{01}$, $(V_{01}-V_{03})$ and $-V_{02}$ are coupled by resistors R68, R69 and R70 to the inverting input of amplifier 54'. A feedback resistor R71 is connected between the amplifier's inverting input terminal and its output terminal. The non-inverting input terminal of amplifer 54' is connected to ground. The voltage $V_0$ at the output of amplifier 54 is equal to the inverted sum of the input voltages applied thereto. The voltages $V_0$, $-V_{01}$ and $(V_{01}-V_{03})$ are fed back over associated conductors 25a, 25b, 25c to input voltage processing means 26 to thereby generate, in combination with transmission line voltage $V_T$, the voltages $V_{T1}$, $V_{T2}$ and $V_{T3}$. The resistance values for resistors R68, R69 and R70 are chosen in relation to the resistance of feedback resistor R71 in order to satisfy the expression for $V_0$ (Equation 1). Thus, resistor R68, R69 and R70 have resistances which are each related to the resistance of resistor R71 in the ratio of ½ to 1, 1 to 1 and 1 to 1, respectively.

Amplifiers 48', 50' and 52' operate in a manner similar to the operation of amplifiers 48, 50 and 52 of FIG. 4a. The major difference between these two sets of amplifiers is that for amplifiers 48', 50' and 52', the output of amplifier 48' is connected to the inverting input terminal of amplifier 52' through a resistor R65 selected so that amplifier 52' generates at its output the voltage $(V_{01}-V_{03})$. For each of amplifiers 48', 50' and 52', the voltages at the inverting input terminals are $V_{01}$, $V_{02}$ and $V_{03}$, respectively, and the voltages at the non-inverting input terminals are $-V_{01}$, $-V_{02}$ and $-V_{03}$, respectively.

Thus, operational amplifiers 48', 50' and 52' generate the voltages $-V_{01}$, $-V_{02}$ and $(V_{01}-V_{03})$ in response to the voltage $V_{T1}$, $V_{T2}$ and $V_{T3}$ and the currents $I_{T1}$, $I_{T2}$ and $I_{T3}$ as altered by the associated gain and impedance control devices. The voltages $-V_{01}$, $-V_{02}$ and $(V_{01}-V_{03})$ are, in turn, combined by amplifier 54' to thereby generate the voltage $V_0$ for insertion in series with the transmission line. As a result of the feedback between means 13 and 26, the voltage $V_0$, which is related to the gain and impedance control devices coupling means 26, 23 to means 13, affects the transmission characteristics of the line in manner equivalent to the effects that would be provided if the voltages $V_{01}$, $V_{02}$ and $V_{03}$ were simultaneously and independently inserted into the line.

To the end that the current $I_0$ described previously in connection with Equation 5 of FIG. 1 may be generated, output current processing means 28 includes four operational amplifiers 62', 64', 66' and 68' their associated input and feedback resistors, and bidirectional current generator 28'. Although the inputs and outputs of each of amplifiers 62', 64' 66' and 68' are voltages representative of a current, for simplicity of description, the various voltages are labeled in FIG. 4b and will be referred to hereinafter by the currents they represent. The input currents to amplifiers 62', 64' and 66' are $I_{01}$, $I_{02}$ and $I_{03}$, respectively. These currents as shown in Equations 12, 13, 14, are related to the output voltages $V_{T1}$, $V_{T2}$ and $V_{T3}$ of processing means 26 and the output currents $I_{T1}$, $I_{T2}$ and $I_{T3}$ of processing means 23 by the various impedance control and gain devices coupled between the outputs of processing means 26 and 23 and the associated inputs of processing means 26 and 23 and the associated inputs of processing means 26 and 23 and the associated inputs of processing means 28. For example, the current $I_{01}$ is related to the output current $I_{T1}$ of processing means 23 by gain control device K2 and to the output voltage $V_{T1}$ of processing means 26 by the impedance control device $Z_2$.

The output currents of amplifiers 62', 64' and 66' are $I_{01}$, $I_{02}$ and $(I_{03}-I_{01})$. The currents $I_{01}$, $I_{02}$ and $(I_{03}-I_{01})$ are coupled by resistors R91, R92 and R93 to the inverting input of amplifier 68'. A feedback resistor R94 is connected between the amplifier's inverting input terminal and its output terminal. The non-inverting input terminal of amplifier 68' is connected to ground. The current $-I_0$ at the output of amplifier 68' is equal to the inverted sum of the input currents applied thereto. The currents $-I_0$, $I_{01}$, and $(I_{03}-I_{01})$ are fed back over associated conductors 29a, 29b, 29c to input current processing means 23 to thereby generate in combination with transmission line current $I_T$, the currents $I_{T1}$, $I_{T2}$ and $I_{T3}$. Resistance values for resistors R91, R92 and R93 are chosen in relation to the resistance of feedback resistor R94 in order to satisfy the expression for $I_0$ (Equation 5). Thus, resistors R91, R92 and R93 have resistances which are related to the resistance of resistor R94 in the ratios of ½ to 1, 1 to 1 and 1 to 1, respectively.

Amplifiers 62', 64' and 66' operate in a manner similar to the operation of amplifiers 62, 64 and 66 of FIG. 4a. The major difference between these two sets of amplifiers is that for amplifiers 62', 64' and 66' the output of amplifier 62' is connected to the inverting input terminal of amplifier 66' through a resistor R88 selected so that amplifier 66' generates at its output the current $(I_{03}-I_{01})$. For amplifiers 62', 64' and 66', the currents at the non-inverting input terminals are $-I_{01}$, $-I_{02}$ and $-I_{03}$, respectively.

Thus, operational amplifiers 62', 64' and 66' generate the currents $I_{01}$, $I_{03}$ and ($I_{03}-I_{01}$) in response to the currents $I_{T1}$, $I_{T2}$ and $I_{T3}$ and in response to the voltages $V_{T1}$, $V_{T2}$ and $V_{T3}$, as altered by the associated gain and impedance control devices. The currents $I_{01}$, $I_{02}$ and ($I_{03}-I_{01}$) are, in turn, combined by amplifier 68' to generate, in combination with current generator 28' the current $I_0$ for insertion in shunt with the transmission line. As a result of the feedback between means 28 and 23, the current $I_0$ (which is related to the gain and impedance devices coupling means 23 and 26 to means 28), affects the transmission characteristics of the line in a manner equivalent to the effects that would be provided if the currents $I_{01}$, $I_{02}$ and $I_{03}$ were simultaneously and independently inserted in the line.

It should be understood that while FIGS. 4a and 4b have shown alternative embodiments for input and output processing means 26, 23 and 13, 28, other embodiments may be generated by either manipulation of Equations 1–8 (FIG. 1) or by consideration of factors relating to operational amplifier coupling.

Figure 5:
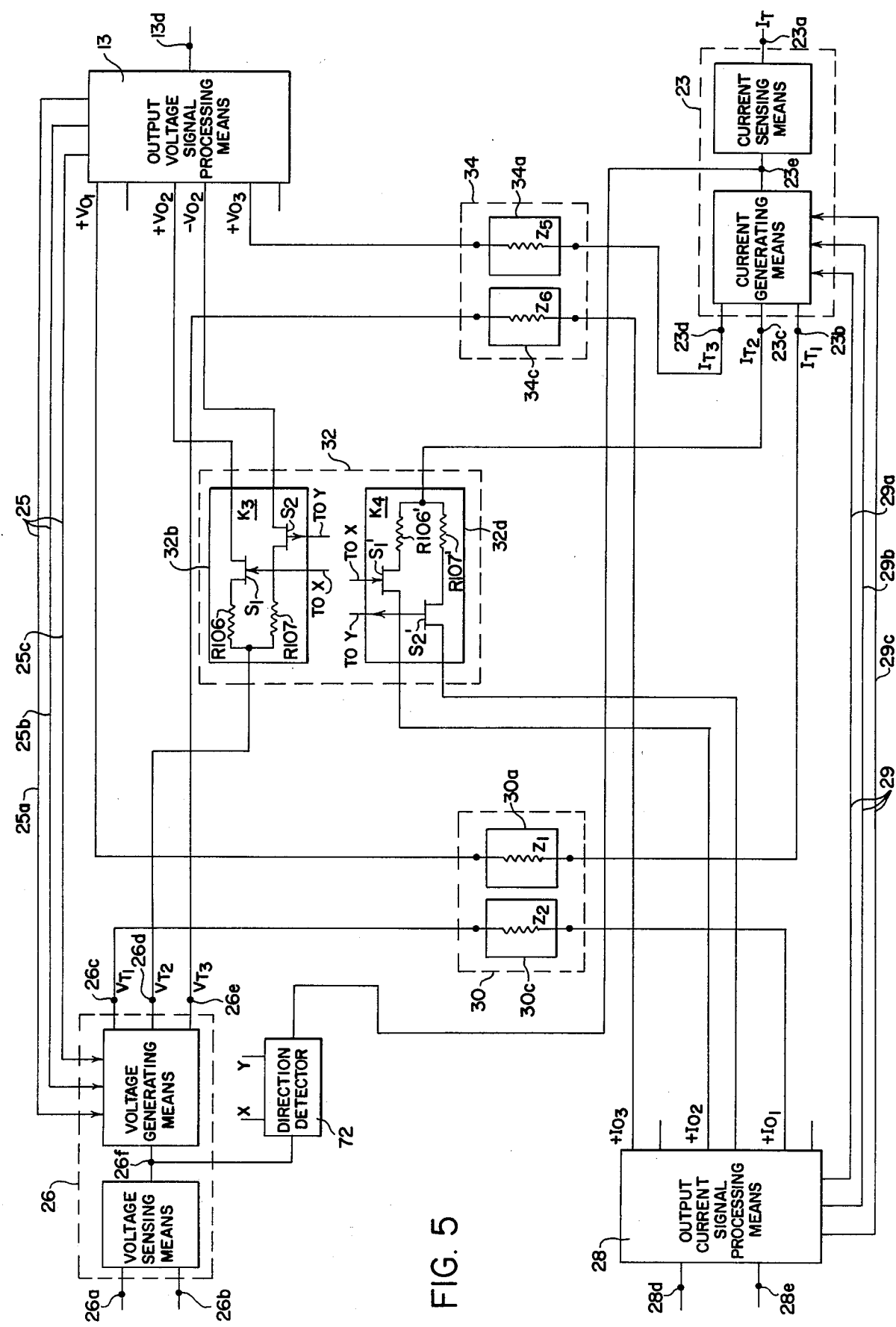
FIGS. 5 and 6 are schematic diagrams each showing one exemplary embodiment of FIG. 1.
Figure 6:
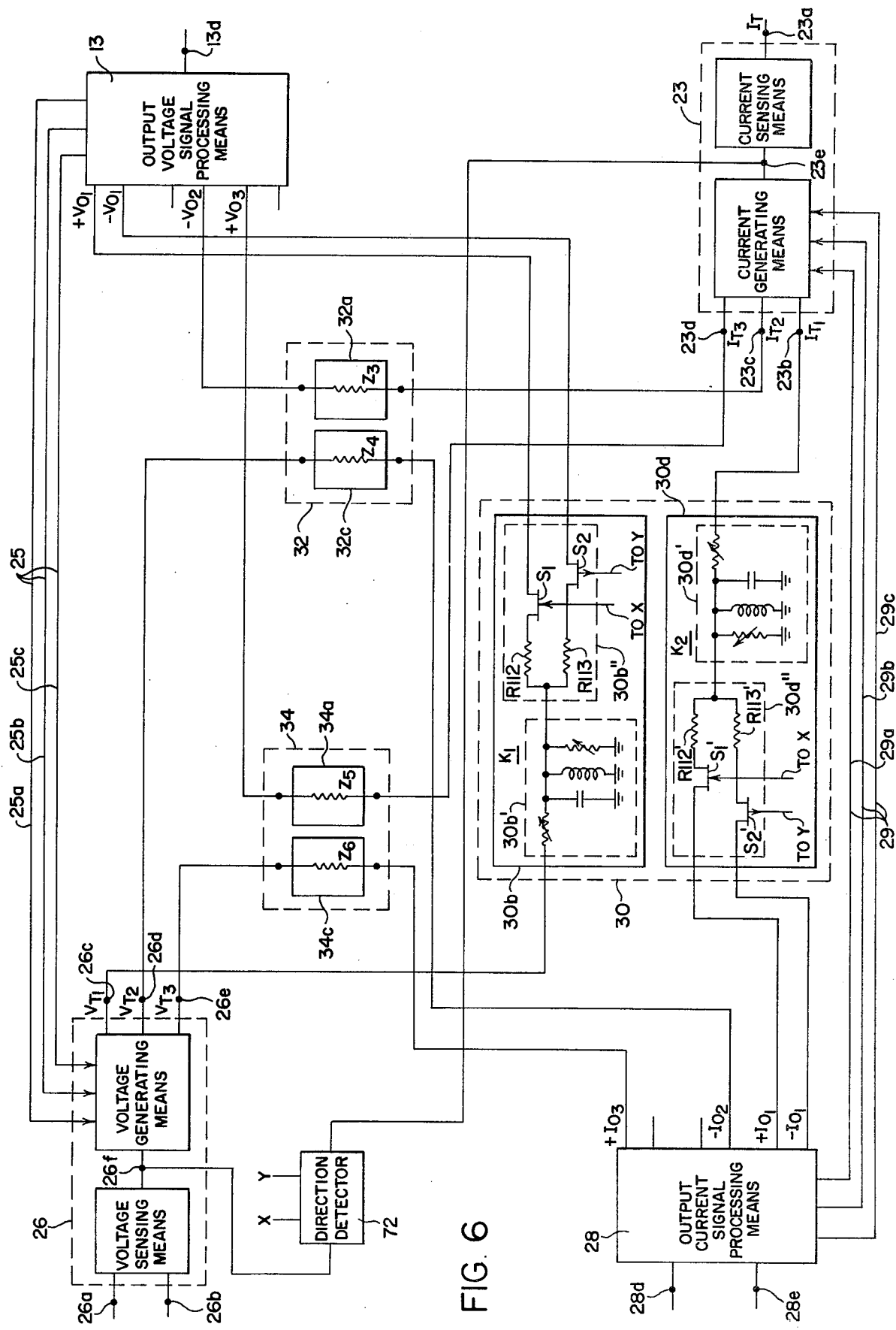

FIGS. 5 and 6 are schematic diagrams which each show an exemplary embodiment of the circuitry shown in FIG. 1 described above. For ease of illustration and description, only that portion of the embodiment of FIG. 1 which includes input voltage and current signal processing means 26 and 23, output voltage and current signal processing means 13 and 28, and the feedback connections therebetween are shown in FIGS. 5 and 6.

For each of the exemplary embodiments of FIGS. 5 and 6, line conditioning control means 30, 32 and 34 are connected as either amplifying and/or impedance simulating type line conditioning units. The aforementioned U.S. Pat. Nos. 3,706,862 (hereinafter the '862 patent) and 3,818,151 (hereinafter the '151 patent), the disclosures of which are hereby expressly incorporated herein by reference, show and describe those amplifying type LCU's which compensate for the attenuation of signals in loaded and non-loaded transmission lines, respectively. The aforementioned U.S. Pat. No. 3,828,281 (hereinafter the '281 patent), the disclosure of which is hereby expressly incorporated herein by reference, shows and describes impedance simulating type LCU's. In order to facilitate an understanding of the exemplary embodiments of FIGS. 5 and 6, the general principles of operation of the LCU's described in the '862, '151 and '281 patents will be summarized.

As described in the '862 and '151 patents, the connection of a impedance network between any of the outputs of processing means 26 and the corresponding non-inverting or inverting input of processing means 13 introduces, in series with the transmission line, an amplifying voltage which additively increases (for the dominant talker) the level of signal transmission through the line.

This amplifying voltage is applied in series with line conductors 12a and 12b through a voltage output connecting means such as transformer 14 (FIG. 1). If the secondary windings 14b, 14c, 14d and 14e of transformer 14 have substantially equal number of turns, the desired voltage is introduced into the transmission line, between terminal pairs T1–T2 and T3–T4, in substantially equal parts. The amplifying voltage introduced in series with the transmission line varies in accordance with the signal voltage across the transmission line. If, as set forth in the '862 patent, the ratio of amplifying voltage to signal voltage is independent of frequency, then the frequency independent attenuation of a loaded transmission line may be compensated for. If, as set forth in the '151 patent, the ratio of amplifying voltage to signal voltage is allowed to vary as a function of frequency, then the frequency dependent attenuation of a non-loaded transmission line may be compensated for.

An impedance network connected between any of the outputs of processing means 28 introduces in shunt with the transmission line an amplifying current which additively increases (for the dominant talker) the level of signal transmission through the line. This amplifying current is applied in shunt with line conductors 12a and 12b through an output current coupling device such as capacitors 18a and 18b (FIG. 1). The amplifying current introduced in shunt with the transmission line varies in accordance with the signal through the transmission line. If, as set forth in the '862 patent, the ratio of amplifying current to signal current is independent of frequency, then the frequency independent attenuation of a loaded transmission line may be compensated for. If, as set forth in the '151 patent, the ratio of amplifying current to signal current is allowed to vary as a function of frequency then the frequency dependent attenuation of a non-loaded transmission line may be compensated for.

In both the '860 and '151 patents, the series and shunt amplifying networks include a network, hereinafter referred to as series and shunt directional control means, each comprise two field effect transistors (FET's) and two resistors. The FET's operate as analog switches which are controlled by signals from a direction detector so as to be either conducting or non-conducting, depending upon the then dominant direction of transmission through the line. The direction detector is connected to the transmission line in a manner so as to respond to both the signal voltage across and the signal current through the transmission line.

The on-state of the FET which is associated with the noninverting input terminal of processing means 13 results in a series-aiding voltage being introduced in series with line conductors 12a and 12b for signals transmitted by station 10 and in a series-opposing voltage being introduced in series with the transmission line for signals transmitted by station 11. This activity is able to proceed substantially independently for the signals of the two parties because of the operation of the superposition principle. Similarly, the on-state of the FET which is associated with the inverting input of processor 13 results in a series-aiding voltage being introduced in series with line conductors 12a and 12b for signals transmitted by station 11 and in a series-opposing voltage being introduced in series with the transmission line for signals transmitted by station 10. This activity is able to proceed substantially independently for the signals of the two parties because of the operation of the superposition principle. Thus, while the circuit of the invention permits transmission in both directions, it aids the transmission of the dominant party and attenuates the transmission of the non-dominant party.

The on-state of the FET which is associated with the noninverting input terminal of processing means 28 results in an additive current being introduced in shunt with line conductors 12a and 12b for signals transmitted by station 10 and a subtractive current being introduced in shunt with the transmission line for signals transmitted by station 11. This activity is able to proceed substantially independently for the signals of the two parties because of the operation of the superposition principle. Similarly, the on-state of the FET which is associated with the inverting input of processor 28 results in an additive current being introduced in shunt with line conductors 12a and 12b for signals transmitted by station 11 and a subtractive current introduced in shunt with the transmission line for signals transmitted by station 10. This activity is able to proceed substantially independently for the signals of the two parties because of the operation of the superposition principle. Thus, while the circuit of the invention permits transmission in both directions, it aids the transmission of the dominant party and attenuates the transmission of the non-dominant party.

The term "dominant" is used herein to identify the station, in a two-station communication system, which at any given time, transmits a signal having a greater amplitude than that of the other station. The term "dominant" is applicable whether the greater amplitude arises because of the absence of transmission by the other station, or because of the simultaneous transmission by that other station of a signal of lower amplitude.

To compensate for the frequency dependent attenuation of non-load transmission lines, frequency-dependent impedances are utilized in conjunction with the directional control FET's. As described in the '151 patent, the frequency dependent impedances may include a tank circuit comprising a capacitor and an inductor, and two resistors each of which may be made adjustable. By selecting the capacitor and inductor to be resonant at a frequency substantially equal to the highest frequency in the transmission band and by selecting resistors to provide proper "Q" for the tank, a frequency dependent or peaking characteristic is produced. This frequency dependent characteristic varies the series and/or shunt gain with the frequency of the transmitted signal to counteract the frequency dependent attenuation characteristic of the non-loaded transmission line.

As described in the '281 patent, an impedance connected between one of the outputs of input current processing means 23 and either of the inputs of output voltage processing means 13 introduces, in series with the transmission line, an impedance simulating voltage which affects transmission through the line in the same manner as a series connected impedance. The impedance simulating voltage is applied in series with line conductors 12a and 12b through voltage output coupling transformer 14 (FIG. 1). If the secondary windings 14b, 14c, 14d and 14e of transformer 14 have substantially equal number of turns, the desired impedance simulating voltage is introduced into the transmission line between terminal pairs $T_1-T_2$ and $T_3-T_4$ in substantially equal parts. If this connected impedance is a resistor, and if this resistor is connected to the inverting input of processor 13 the simulated series impedances will be positive and resistive. Similarly, if the impedance is a resistor, and if this resistor is connected to the non-inverting input of processor 13, the simulated series impedance will be negative and resistive. In addition, if the resistance is relatively large, the simulated series resistance will be relatively small and if the resistance is relatively small the simulated series resistance will be relatively large. The latter relationship holds for both positive and negative simulated resistances.

An impedance connected between one of the outputs of input voltage processing means 26 and either of the inputs of output current processing means 28 introduces, in shunt with the transmission line, an impedance simulating current which affects transmission through the line in the same manner as shunt connected impedance. The impedance simulating current is applied in shunt with line conductors 12a and 12b through current output coupling capacitors 18a and 18b (FIG. 1). If the impedance simulating currents through capacitors 18a and 18b are substantially equal but opposite in sign, the desired impedance simulating currents introduced into conductor pairs $12a_1-12a_2$ and $12b_1-12b_2$ are substantially equal and opposite. If this connected impedance is a resistor, and if this resistor is connected to the inverting input of processor 28 the simulated shunt impedance will be positive and resistive. Similarly, if the impedance is a resistor, and if the resistor is connected to the non-inverting input of processor 28, the simulated shunt impedance will be negative and resistive. In addition, if the resistance of this resistor is small, the resistance of the simulated resistor between conductors 12a and 12b will be relatively small and if the resistance is relatively large, a relatively large simulated resistor will appear between those conductors. The latter relationship holds for both positive and negative simulated resistances.

If it is desirable for the simulated series and/or shunt impedances to be other than resistive, such impedances may also be generated in the manner described in the '281 patent, capacitive impedances resulting in simulated inductances and inductive impedances resulting in simulated capacitances.

As described above, the connection of an impedance between an output of processor 23 and the non-inverting input terminal of output processing means 13 produces effective negative series resistance in the line. These negative series resistances simultaneously aid the transmission of signals from both the dominant and non-dominant stations. The connection of an impedance between an output of processor 26 and the non-inverting input terminal of output processing means 28 produces effective negative shunt resistances in the line. These negative shunt resistances simultaneously aid the transmission of signals from both the dominant and the non-dominant stations.

The connection of an impedance between an output of processor 23 and the inverting input terminal of processor 13 produces effective positive series resistance in the line. These positive series resistances, simultaneously oppose the transmission of signals from the dominant and non-dominant stations. The connection of an impedance between an output of processor 26 and the inverting input terminal of output processing means 28 produces effective positive shunt resistance in the line. These positive shunt resistances, simultaneously oppose the transmission of signals from both the dominant and non-dominant stations.

To the end that the circuit of the invention may be used to affect the transmission characteristics of the line in a manner so as to simultaneously and independently provide gain to the dominant party as well as provide line buildout to the sections of the transmission line coupling the circuit of the invention to stations 10 and 11, there is shown the embodiment of FIG. 5. In FIG. 5, which is an exemplary embodiment of FIG. 1, line conditioning control means 30 and 34 are connected as impedance simulating type LCU's, and control means 32 is connected as an amplifying type LCU. Control means 30 and 34 are utilized in this embodiment to simulate the presence of positive impedances and thereby serve as line-build-out networks. Control means 32 is utilized in this embodiment to compensate for the frequency independent attenuation of a loaded transmission line. In the embodiment of FIG. 5, control means 30 and 34 are comprised only of their associated impedance simulating control devices ($Z_1$, $Z_2$ and $Z_5$, $Z_6$) and control means 32 is comprised only of gain control devices ($K_3$ and $K_4$). Thus, FIG. 5 represents a simplified case of the general case shown in FIG. 1.

To simulate the presence of positive impedances and thereby serve as line-build-out networks, control means 30 and 34 each have a first resistance means 30a and 34a, respectively, connected between the associated output terminal of processing means 23 and the corresponding non-inverting input terminal of processing means 13 and a second resistance means 30c and 34c, respectively, connected between the associated output terminal of processing means 26 and the corresponding non-inverting input terminal of processing means 28. The connection of the first resistance means 30a, 34a between processing means 23 and processing means 13 causes that part of the voltage $V_0$ generated by processing means 13 which is attributable to control means 30 and 34 viz. $V_{01}$ and $V_{03}$, respectively, to affect transmission through the line in the same manner as positive impedances connected in series with the transmission line. The connection of the second resistance means 30c, 34c between processing means 26 and processing means 28 causes that part of the current $I_0$ generated by processor 28 which is attributable to control means 30 and 34 viz. $I_{01}$ and $I_{03}$, respectively, to affect transmission through the line in the same manner as positive impedances connected in shunt with the transmission line.

To compensate for the frequency independent attenuation of a loaded transmission line, control means 32 has gain control device, $K_3$, which here takes the form of a first directional control means 32b, connected between output terminal 26d of processing means 26 and input terminal pair 13b of processing means 13 and gain control device $K_4$, which here takes the form of a second directional control means 32d, connected between output terminal 23c of processing means 23 and input terminal pair 28b of processing means 28. Control means 32b includes P- and N- channel junction of FET's $S_1$ and $S_2$, respectively, and their associated resistors R106 and R107. Control means 32d includes P- and N- channel FET's $S_1$ and $S_2'$, respectively, and their associated resistors R106' and R107'. As control means 32b and 32d serve the same function and operate in the same manner, only one of the circuits will be described in detail and the other will be understood to operate in a similar manner under similar conditions.

Directional control means 32b serves to electrically connect output terminal 26d of processor 26 to the noninverting input of terminal pair 13b, for processor 13, when station 10 is the dominant transmitter. Control means 32b also serves to electrically connect output terminal 26d to the inverting input of terminal 13b when station 11 is the dominant transmitter.

In particular, for control means 32b, transistor $S_1$ is turned on by means of a voltage applied through a conductor x to connect through resistor R106, the output voltage $V_{T2}$ of processing means 26 to the non-inverting input for voltage $V_{02}$ of processing means 13, when a direction detector 72 compares the phase relationship between the signals at the outputs 26f and 23e, respectively, of the voltage and current sensing portions of associated processing means 26 and 23 and determines therefrom that station 10 is the dominant transmitter. Similarly, transistor $S_2$ is turned on by means of a voltage applied through a conductor y to connect through resistor R107 the output $V_{T2}$ of processing means 26 to the inverting input for voltage $V_{02}$ of processing means 13 when direction detector 72 compares the signals at the outputs 26f, 23e of the sensing portions of associated processing means 26, 23 and determines therefrom that the dominant direction of transmission is from station 11. Phase comparison and control circuitry suitable for use in direction detector 72 is described in detail in the '862 patent. Another exemplary embodiment for direction detector 72 is shown in the schematic diagram of FIG. 7, to be described in more detail below. In view of the foregoing, it is apparent that the circuit of FIG. 5 provides an apparatus for affecting the transmission characteristics of the line which simultaneously and independently produces, by the generation of a single voltage and a single current, gain to the dominant party as well as line buildout.

To the end that the circuit of the invention may be used to affect the transmission characteristics of the line in a manner so as to simultaneously and independently produce increased gain to the dominant party while retaining the differentially switched gain characteristic and also provide line buildout; there is shown the embodiment of FIG. 6. In FIG. 6, which is an exemplary embodiment of FIG. 1, control means 30 is connected as an amplifying type LCU and control means 32 and 34 are connected as impedance simulating type LCU's. Control means 30 is utilized in this embodiment to compensate for the frequency dependent attenuation of a nonloaded transmission line. Control means 32 is utilized in this embodiment to simulate the presence of negative impedances and thereby provide gain, whereas control means 34 is utilized in this embodiment to simulate the presence of positive impedances and thereby serve as a line-build-out network. In the embodiment of FIG. 6, control means 30 is comprised only of gain control devices ($K_1$ and $K_2$) and control means 32 and 34 are comprised only of impedance simulating control devices ($Z_3$, $Z_4$ and $Z_5$, $Z_6$). Thus, FIG. 6 represents a simplified case of the general cases shown in FIG. 1.

To compensate for the frequency dependent attenuation of a non-loaded transmission line, line conditioning control means 30 has gain control device, $K_1$, which here takes the form of a first amplification means 30b comprising the combination of frequency compensating means 30b' and directional control means 30b" connected between output terminal 26c of processing means 26 and input terminal pair 13a of processing means 13, and second amplification means 30d comprising the combination of frequency compensating means 30d' and directional control means 30d" connected between output terminal 23b of processing means 23 and input terminal pair 28a of processing means 28. Directional control means 30b" are identical in structure and function and operate in the same manner as directional control means 32b and 32d described previously for FIG. 5. A direction detector 72 which operates in a manner identical to the operation described above for direction detector 72 of FIG. 5 has its inputs connected to the voltage sensing portion of processor 26 and the current sensing portion of processor 23.

As described previously, selection of the resonant frequency of the inductor and capacitor comprising the tank circuit included in frequency compensation means 30b' and 30d' causes the generation of a frequency dependent peaking characteristic at the input of the associated directional control means 30b" and 30d". In combination with control means 30b" the frequency dependent characteristic of compensating means 30b' counteracts the frequency dependent attenuation characteristic of the non-loaded transmission line to thereby provide series gain to the dominant station and series attenuation to the non-dominant station. In combination with control means 30d'' the frequency dependent characteristic of compensating means 30d' counteracts the frequency dependent attenuation characteristic of the non-loaded transmission to thereby provide shunt gain to the dominant station and shunt attenuation to the non-dominant station.

The simulate the presence of negative impedances and thereby provide series and shunt gain simultaneously to both the dominant and non-dominant station, control means 32 has a first resistance means 32a connected between output terminal 23c of processing means 23 and the corresponding inverting input of terminal pair 13b of processing means 13 and a second resistance means 32c connected between output terminal 26d of of processing means 26 and the corresponding inverting input of terminal pair 28b of processing means 28. The connection of the resistance means in the manner described above causes that part of the voltage $V_0$ generated by means 13 which is attributable to means 32a, viz, $V_{02}$, to affect transmission through the line in the same manner as a negative impedance connected in series with the transmission line and causes that part of the current $I_0$ generated by means 28 which is attributable to means 32c, viz. $I_{02}$, to affect transmission through the line in the same manner as a negative impedance connected in shunt with the transmission line.

To simulate the presence of positive impedances and thereby serve as a line-build-out network, control means 34 has a first resistance means 34a connected between output terminal 23d of processing means 23 and the non-inverting input of terminal pair 13c of processing means 13 and a second resistance means 34c connected between output terminal 26e of processing means 26 and the non-inverting input of terminal pair 28c of processing means 28. Control means 34 functions in a manner identical to the function described above for control means 34 of FIG. 5. In view of the foregoing, it is apparent that the circuit of FIG. 6 provides an apparatus for affecting the transmission characteristics of the line which simultaneously and independently produces by the generation of a single voltage and a single current increased gain to the dominant party while retaining the differentially switched gain characteristic and also provides line buildout.

FIGS. 5 and 6 have each shown schematic diagrams wherein the invention is embodied as various tri-section apparatuses for affecting the transmission characteristics of a voice frequency telephone transmission line to thereby improve the signal transmission through the line. Thus, the embodiments illustrated in FIGS. 5 and 6 each cause, according to the principles of the invention, three non-interactive effects to occur simultaneously to the transmission characteristics of the line. In view of the foregoing, it is apparent that the embodiments illustrated in FIGS. 5 and 6 each provide an apparatus which by the generation of a single voltage and a single current causes three independent non-interactive effects to occur simultaneously to the transmission characteristics of the line.

While the embodiments illustrated in FIGS. 5 and 6 have each shown the inputs of direction detector 72 connected to the outputs 26f, 23e of the sensing portions of associated processing means 26, 23, it should be appreciated that the direction detector input terminals may, depending upon certain factors to be enumerated below, be connected to various outputs of processing means 26 and 23. The factors to be considered in determining the terminals to which the inputs of detector 72 are to be connected include the phase of the cable, the effect of cable phase on the LCU's, whether hysteresis is to be added to either direction and whether it is desired to obtain the best indication of which party is dominant or whether it is desired to provide some other effect such as phase alteration so as to aid the transmission in one direction. The effect of adding hysteresis in a given direction is to aid the dominant party for that direction, be it station 10 or station 11, in maintaining dominancy.

It should be appreciated that the gain control devices are always connected between similar input and output processing means, i.e. between input voltage processing means 26 and output voltage processing means 13 and between input current processing means 23 and output current processing means 28. Similarly, the impedance simulation control devices are always connected between dissimilar input and output processing means, i.e., between input voltage processing means 26 and output current processing means 28 and between input current processing means 23 and output voltage processing means 13.

Figure 7:
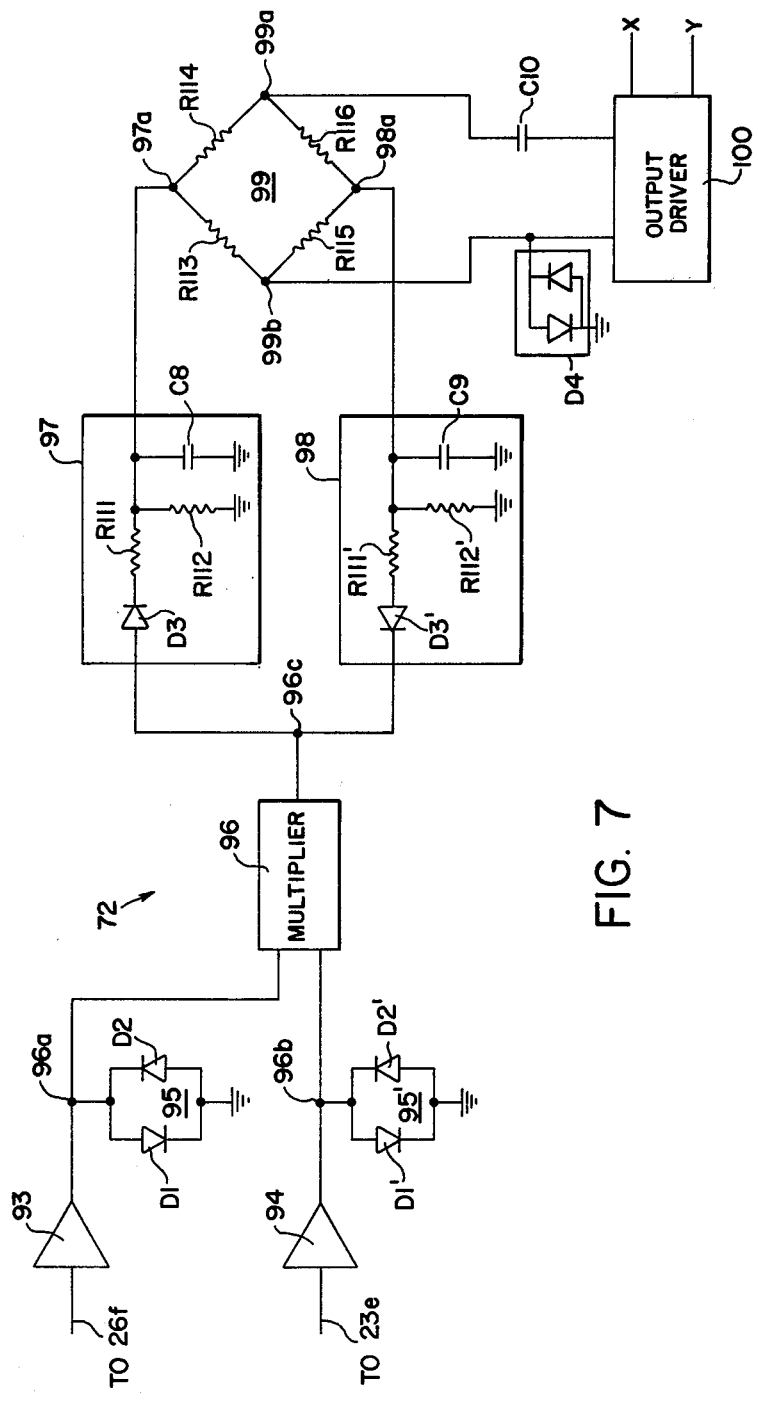
FIG. 7 is a schematic diagram of an exemplary embodiment of the direction detector shown in FIGS. 5 and 6.

Referring to FIG. 7, there is shown a schematic diagram of another exemplary embodiment for direction detector 72.

The direction detector includes first and second preamplifiers 93 and 94, which are responsive, respectively, to the signal generated at output 26f of voltage sensing means 26' and the signal generated at output 23e of current sensing means 23'. When the input signal to each preamplifier is below a predetermined threshold the preamplifier will not be activated. The threshold voltage is selected such that the direction detector does not respond to noise on the transmission line. When the input signal to each of preamplifiers 93 and 94 exceeds the predetermined threshold the output is clamped to a predetermined voltage by the associated diode network 95 and 95' which are identical in structures. The output of preamplifier 93 is connected to input 96a of multiplier 96 and the output of preamplifier 94 is connected to input 96b of multiplier 96.

Multiplier 96 operates so as to provide an output which is proportional to the magnitude of the input signals from preamplifiers 93 and 94, and whose polarity is equal to the product of the polarities of the signals from preamplifiers 93 and 94. In absence of any transmission by station 10 and station 11 the output of multiplier 96 has a magnitude of zero. When the voltage across the transmission line, $V_T$ and the current through the transmission line, $I_T$ are in phase the output voltage of the multiplier has a positive polarity. When the voltage $V_T$ and the current $I_T$ are 180° out of phase the output voltage of the multiplier has a negative polarity. The voltage and current being in phase indicates that one party either station 10 or station 11 is dominant and that the other party either station 11 or station 10 is non-dominant. Similarly, the voltage and current being 180° out of phase indicates dominancy by one party (either station 11 or station 10) and non-dominancy by the other party (either station 10 or station 11).

When both parties are transmitting above the threshold and at equal loudness the transmission line voltage, $V_T$, and transmission line current, $I_T$, are 90° out of phase. The output of the multiplier then alternates in polarity from plus to minus or minus to plus at least once during each cycle. If the signals utilized to switch the FET's contained in directional control means 32b, 32d of FIG. 5 and 30b, 30d of FIG. 6 were taken directly from the output of the multiplier, the FET's would each for equal loudness by both parties switch on and off at least once during each cycle. Such switching is objectionable as the FET's should only be switched when aiding the dominant party and not when neither party is dominant.

To avoid the problems described above and provide other benefits to be described below, the output signal of multiplier 96 is then coupled to positive and negative rectifying networks 97 and 98, respectively. Networks 97 and 98 are identical in structure and operate in a similar fashion, the only difference being that network 97 operates on signals of positive polarity from multiplier 96, whereas network 98 operates on signals of negative polarity from multiplier 96. Networks 97 and 98 each contain an R-C circuit combination which operates in a manner so as to allow for both quick turn on and slow turn off of the FET's comprising a given directional control means. Quick turn on is necessary so as to provide immediate gain to the newly dominant party to thereby avoid missing syllables. Slow turn off is usually desirable to avoid turning off a FET in between syllables of the dominant party.

The outputs of networks 97 and 98 are coupled at terminals 97a and 98a, respectively, to resistive network 99. Network 99 comprised of resistors R113, R114, R115 and R116 provides outputs at terminals 99a and 99b which are equal to the sum of the outputs of rectifying networks 97 and 98. Output 99b provides a signal input to driver 100 which is just sufficient in amplitude to turn on either of the FET's. The signal from output terminal 99b is prevented from rising further in amplitude by the clamping action of diode D4. The signal on output terminal 99a is coupled to driver 100 through capacitor C10. Capacitor C10 operates in a manner so as to provide a signal which is a function of the rate of change between the outputs of networks 97 and 98. This signal operates so as to overcome the normally slow turn off of the FET's so as to provide a quick turn off of the on FET, such that the off FET may then be turned on quickly. A quick turn off of the on FET is needed, where with one party dominant, the signal strength of the non-dominant party rises rapidly, thereby indicating that the non-dominant party will within a very short period of time become dominant.

Thus, the exemplary embodiment of FIG. 7 has shown a direction detector which operates in a manner such that gain is always provided to the dominant party and loss is always provided to the non-dominant party.

Figure 8:
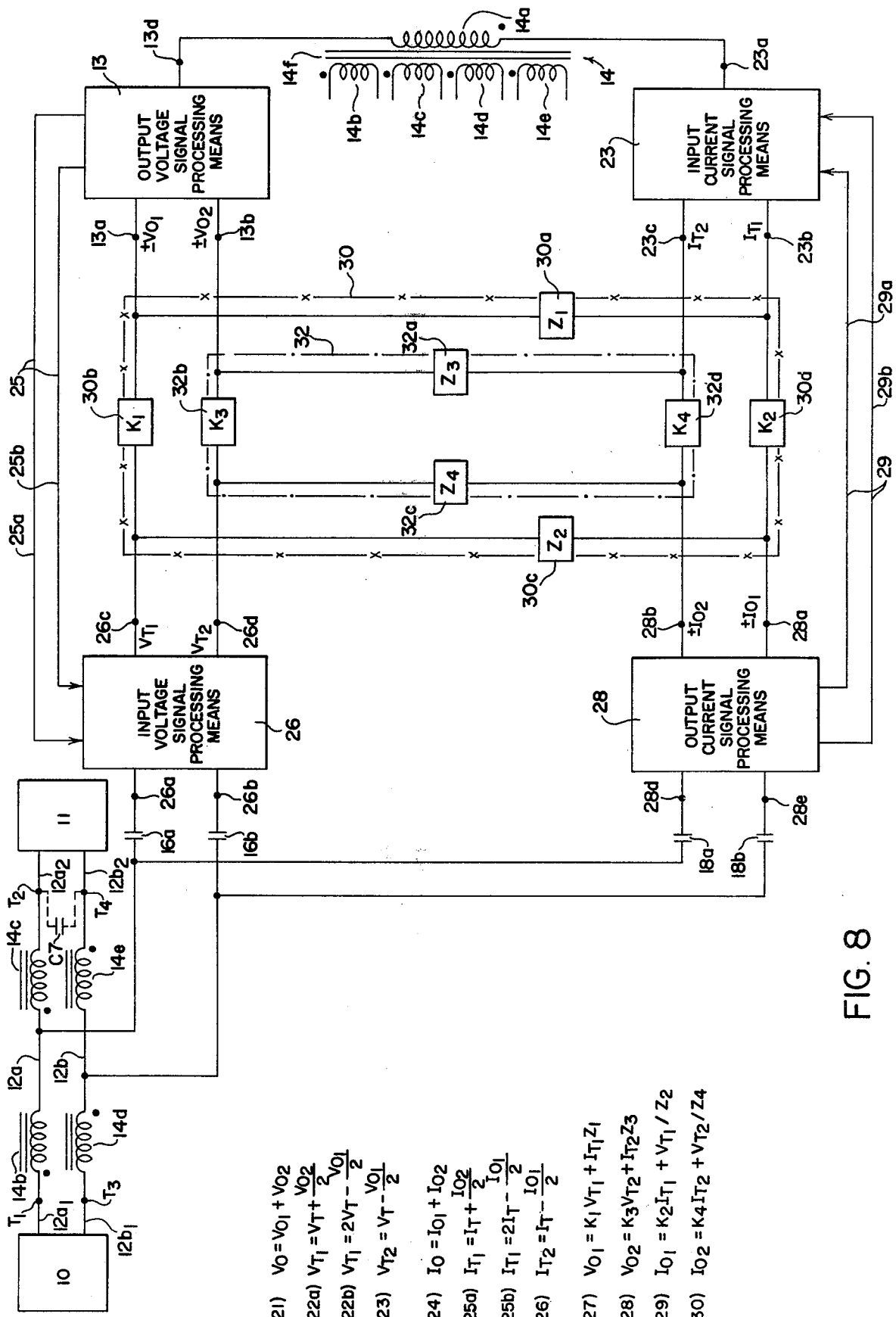
FIG. 8 is a combined block-schematic diagram which illustrates a bi-sectional embodiment of the invention.

To the end that the circuit of the invention may be used in a manner so as to simultaneously cause by the generation of a single voltage and a single current two independent effects on the characteristics of the line, there is shown the embodiment of FIG. 8. The circuit of FIG. 8 is in many respects similar to the circuit of FIG. 1, described previously, and like functioning parts are similarly numbered. Thus, only the differences between the circuit of FIG. 8 and the circuit of FIG. 1 need be set forth.

The effective result of the utilization of the embodiment of the invention shown in FIG. 8 can be illustrated as an equivalent circuit, which is not shown, as it is substantially identical to the equivalent circuit shown in FIG. 2a for the embodiment of FIG. 1. The equivalent circuit of FIG. 2a includes line conditioning network 40 which would not appear in an equivalent circuit for the bi-section apparatus of FIG. 8. From the equivalent circuit of FIG. 2a it can be seen that with network 40 eliminated, the bi-section apparatus transforms the impedance $Z_{10}$ of the transmission line looking from the circuit of the invention toward station 10 to an impedance $Z_{10/12}$ at station 11 and transforms the impedance $Z_{11}$ of the transmission line seen looking toward station 11 to an impedance $Z_{11/12}$ at station 10.

As FIG. 8 illustrates a bi-section apparatus, processing means 26 generates at its output terminals 26c and 26d only two voltages designated as $V_{T1}$ and $V_{T2}$, respectively. Processing means 23 generates at its output terminals 23b and 23c only two currents designated at $I_{T1}$ and $I_{T2}$, respectively; processing means 13 has only two input voltages designated as $V_{01}$ and $V_{02}$ and processing means 28 has only two input currents designated as $I_{01}$ and $I_{02}$. A capacitor, C7, which will be described in connection with FIGS. 11a–11d, is connected between terminals $T_2$ and $T_4$ of station 11.

The voltage of output 13d of processor 13 is designated as $V_0$ and, as shown in equation 21 (FIG. 8) is the sum of the voltages $V_{01}$ and $V_{02}$. Voltage $V_0$ is introduced in series with transmission line conductors 12a and 12b through the transformer 14. Equations 22 and 23 give the relationships between the input voltages $V_{T1}$ and $V_{T2}$ and the output voltages $V_{01}$ and $V_{02}$ of control means 30 and 32, respectively, as a function of the transmission line voltage, $V_T$. As described previously for FIG. 1, predetermined combinations of the voltages $V_{01}$ and $V_{02}$ are fed back from processing means 13 over feedback paths 25a and 25b (only two such paths are needed for the bi-section embodiment) to be combined at processing means 26 with the signal voltage $V_T$ to thereby generate $V_{T1}$ and $V_{T2}$.

The current $I_0$ at the outputs 28d and 28e of processing means 28 is designated as $I_0$ and as is shown in equation 24 is the sum of the currents $I_{01}$ and $I_{02}$. Current $I_0$ is introduced in shunt with transmission line conductors 12a and 12b. Equations 25 and 26 give the relationships between the input currents $I_{T1}$ and $I_{T2}$ and the output currents $I_{01}$ and $I_{02}$ of control means 30 and 32, respectively, as a function of the transmission line current $I_T$. As described previously for FIG. 1, predetermined combinations of the currents $I_{01}$ and $I_{02}$ are fed back from output processing means 28 over feedback paths 29a and 29b (only two such paths are needed for the bi-section embodiment) to be combined at processing means 23 with the signal current $I_T$ to thereby generate $I_{T1}$ and $I_{T2}$.

The relationships of the voltages $V_{01}$ and $V_{02}$ to the voltages $V_{T1}$ and $V_{T2}$ and the currents $I_{T1}$ and $I_{T2}$ as a function of the associated gain control and impedance simulating control devices $K_1$ and $Z_1$, and $K_3$ and $Z_3$ are given in equations 27 and 28, respectively, of FIG. 8. The relationship of the currents $I_{01}$ and $I_{02}$ to the voltages $V_{T1}$ and $V_{T2}$ and the currents $I_{T1}$ and $I_{T2}$ as a function of the associated gain control and impedance simulating control devices $K_2$ and $Z_2$, and $K_4$ and $Z_4$ are given in equations 29 and 30 of FIG. 8.

The equations (15 through 20) shown in FIGS. 3a and 3b for the impedance and insertion gain which result from the utilization of the circuit of the invention are also applicable, when modified as described below, to the embodiment of FIG. 8. In order that equations 15 through 20 may be applicable to the bi-section apparatus of FIG. 8, those terms in each equation which are functions of the gain control and impedance simulating control devices $Z_5$, $Z_6$, $K_5$ and $K_6$ (which comprise control means 34 of FIG. 1) are eliminated. The impedances $Z_{11/12}$ and $Z_{10/12}$ provided by the circuit of FIG. 8 would then be equal to the impedances $Z_{11}$ and $Z_{10}$, respectively, times the product of the impedance transformations provided by each of the conceptually separate networks 36 and 38 of FIG. 2a. The insertion gains $G_{10/11}$ and $G_{11/10}$ provided by the circuit of FIG. 8 would then be equal to the product of the insertion gains provided by each of the conceptually separate networks 36 and 38 of FIG. 2a.

Alternative circuit schematics for input processing means 26 and 23, and output processing means 13 and 28 of the embodiment of FIG. 8 are not shown as these schematics are, except for the differences described previously and again below, substantially identical to the alternative circuit schematics shown in FIGS. 4a and 4b for the embodiment of FIG. 1. These differences are in the number of feedback paths needed between the output processing means and the associated input processing means, and in that the processing means 26 and 23 need not generate the voltage $V_{T3}$ and the current $I_{T3}$, respectively, and that processing means 13 and 18 need not have input terminals for the voltage $\pm V_{O3}$ and the current $\pm I_{O3}$, respectively. Thus, those portions of the circuits illustrated in FIGS. 4a and 4b which relate to the voltages and currents identified above can be eliminated if equivalent circuit diagrams are drawn for the bi-section apparatus of FIG. 8. Other circuit diagrams for the input and output processing means 26, 23 and 13, 28 of the bi-section apparatus may be generated by either manipulation of Equations 21-26 or by consideration of factors relating to amplifier coupling.

In view of the foregoing, it is apparent that the circuit of FIG. 8 provides a bi-section apparatus which by the generation of a single voltage and a single current, simultaneously and independently causes two non-interactive effects to occur to the transmission characteristics of the line.

Figure 9:
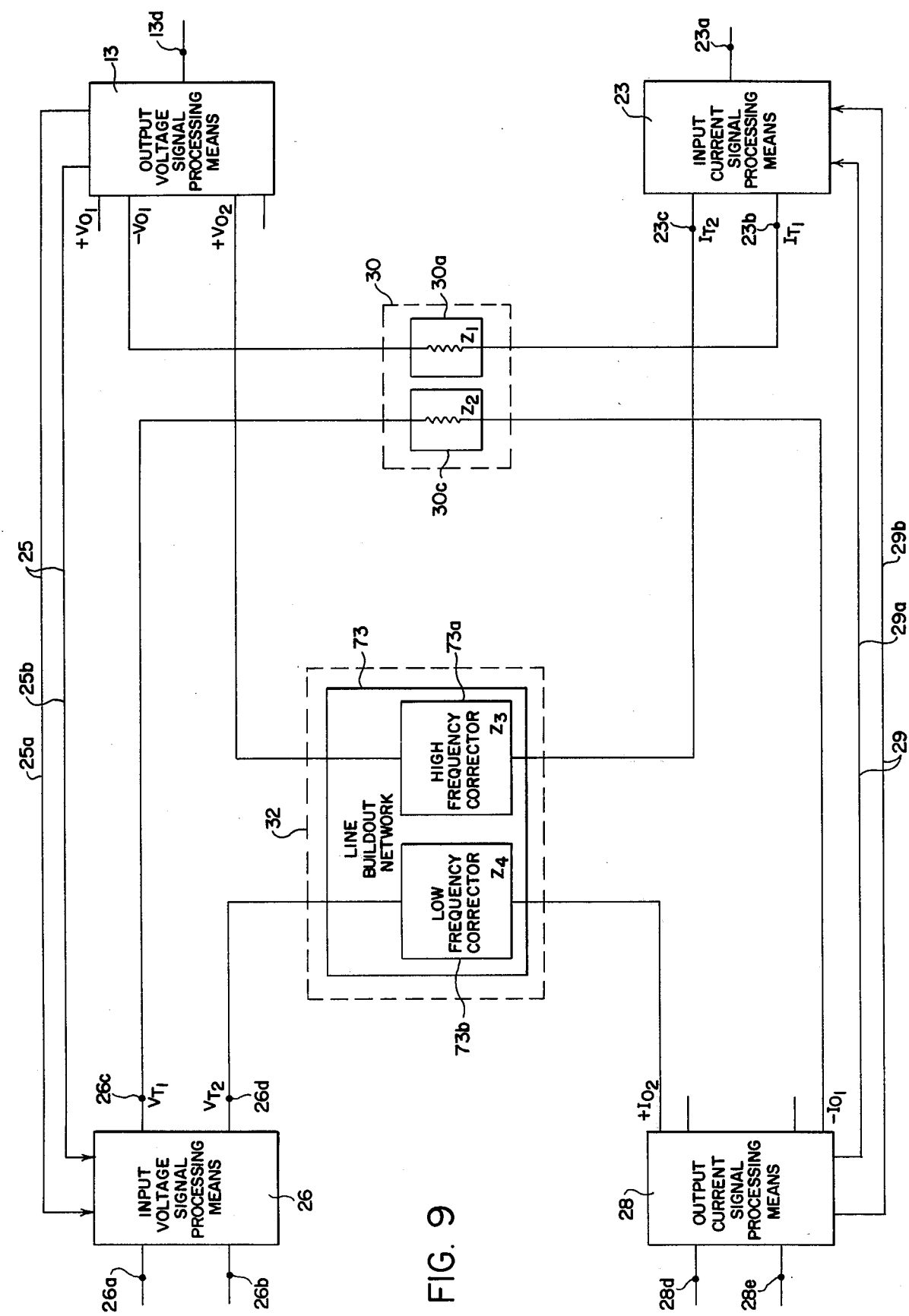
FIG. 9 is a schematic diagram showing one exemplary embodiment of FIG. 8.

To the end that the bi-section apparatus of FIG. 8 may be utilized to affect the characteristics of a loaded transmission line in a manner so as to simultaneously and independently cause increased gain to both the dominant and non-dominant parties as well as line build-out to thereby linearize the frequency dependent impedance characteristic of the line, there is shown the embodiment of FIG. 9.

In FIG. 9, which is an exemplary embodiment of FIG. 8, control means 30 is connected as an impedance simulating type LCU and control means 32 is also connected as an impedance simulating type LCU which functions as a frequency dependent line-build-out network 73. Control means 30 is in this embodiment, connected in the manner described previously for control means 32 of FIG. 6, is used to simulate the presence of negative impedances and thereby provide gain. Control means 32 in this embodiment utilizes low and high frequency correction means 73a and 73b, respectively, to compensate for the frequency dependent impedance of the transmission line. The manner in which the low and high frequency correction means operates so as to transform the frequency dependent transmission line impedance is shown in the characteristics of FIGS. 11a-d to be described hereinafter. From the latter figures, it is apparent that the combined effect of correctors 73a and 73b is to linearize the resistive portion of the frequency dependent impedance characteristic of the loaded line.

Figure 10A:
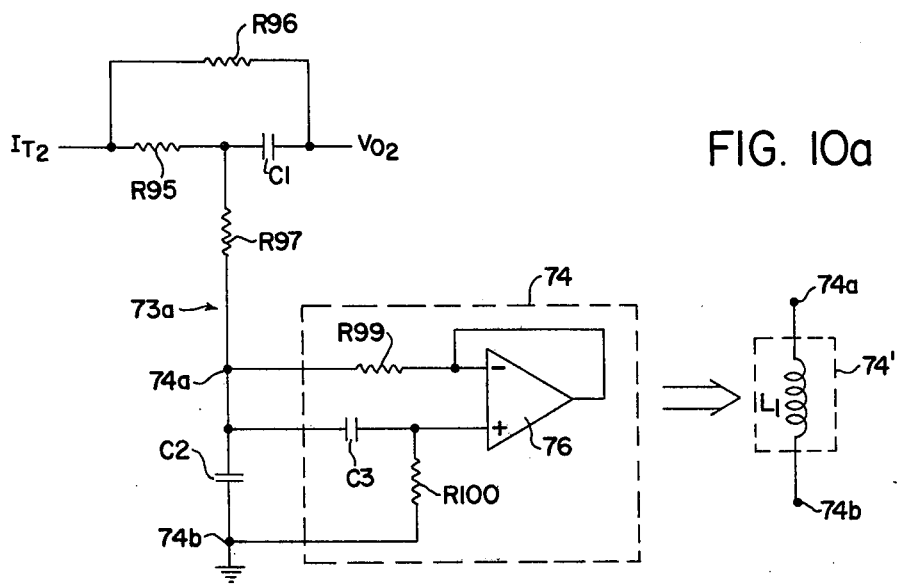
FIGS. 10a and 10b show schematic diagrams of the low and high frequency correction means, respectively, which comprise the line-build-out network of FIG. 9.
Figure 10B:
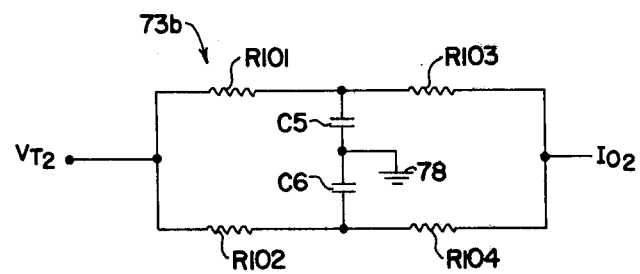

Referring to FIGS. 10a and 10b, there are shown schematic diagrams of the high and low frequency correction means 73a and 73b, respectively, which comprise line-build-out network 73.

The high frequency correction means 73a (FIG. 10a) includes circuit 74 which comprises operational amplifier 76 having resistor R99 connected to the amplifier's inverting input terminal and the combination of capacitor C3 and resistor R100 connected to the amplifier's non-inverting input terminal. Circuit 74, which is coupled to capacitor C2 at terminals 74a and 74b operates in the same manner as if a positive inductor 74' having a frequency dependent inductance L1, is connected across terminals 74a and 74b.

High frequency correction means 73a is connected between output 23c of processing means 23 and the non-inverting input of terminal pair 13b of processing means 13. The connection of the high frequency correction means in the manner described above causes that part of the voltage $V_0$ generated by means 13 which is attributable to this correction means to affect transmission through the line in the same manner as if a positive impedance, such that the desired impedance transformation arises, were connected in series with the transmission line.

Representative values of the components of correction means 73a for a 24 gauge loaded transmission line, are listed below for illustrative purposes:

| | |
|---|---|
| R95 | $30.1 \times 10^3$ ohms |
| R96 | $1.5 \times 10^6$ ohms |
| R97 | $20 \times 10^3$ ohms |
| R99 | $1.5 \times 10^3$ ohms |
| R100 | $205 \times 10^3$ ohms |
| C1 | 1000 picofarad |
| C2 | 750 picofarad |
| C3 | 2200 picofarad |

Referring to FIG. 10b there is shown the schematic diagram of the low frequency correction means 73b. The input voltage, $V_{T2}$ in this embodiment, is coupled through resistor R101 to the junction of one side of capacitor C5 and one end of resistor R103 and through resistor R102 to one side of capacitor C6 and one end of resistor R104. The opposite sides of capacitors C5 and C6 are connected to ground 78. The opposite ends of resistors R103 and R104 are connected to each other.

The low frequency correction means 73b is connected between output 26d of processing means 26 and the non-inverting input of terminal pair 28b of processing means 28. The connection of the low frequency correction means in the manner described above causes that part of the current $I_0$ generated by processor 28 which is attributable to this correction means to affect transmission through the line in the same manner as if a positive impedance, such that the desired impedance transformation arises, were inserted in shunt with the transmission line.

Representative values of the components of correction means 73b for a 24 gauge loaded transmission line are listed below for illustrative purposes:

| | |
|---|---|
| R101 | $442 \times 10^3$ ohms |
| R102 | $47.5 \times 10^3$ ohms |
| R103 | $40.2 \times 10^3$ ohms |
| R104 | $18.2 \times 10^3$ ohms |

| | |
|---|---|
| C5 | 0.0015 microfarad |
| C6 | 0.033 microfarad |

In the realization of FIG. 9, the impedance simulating LCU 30 is connected in combination with the line-build-out network 73 (LCU 32) to the two wire transmission line between transmitting-receiving stations 10 and 11. If station 10 comprises a central office and station 11 a telephone set, then the transmission line therebetween is a subscriber line. Under these circumstances the circuit of FIG. 9 is connected between the central office and one end of the subscriber line, the other end of the transmission line being connected to the subscriber's telephone set. The impedance presented by the central office to the circuit of FIG. 9 is then, as is well known in the art, 900 ohms in parallel with 2uf. The impedance presented by the transmission line to the circuit of FIG. 9 in the absence of the line-build-out network 73 of the invention, on the other hand, varies as a function of frequency, the particular function being dependent on whether the line is a loaded or non-loaded transmission line. It is desired, however, that in combination with the line-build-out network 73 that the transmission line also present to the circuit of FIG. 9 an impedance whose magnitude is 900 ohms. Such an impedance results in an impedance match which ensures that there will be no echoes or reflections which may be retransmitted by the circuit of FIG. 9 as well as ensuring maximum transfer of power from the central office to the transmission line. In order to explain the impedance compensating function of line-build-out network 73, it is assumed for purposes of illustration that the transmission line is a loaded line.

Figure 11A:
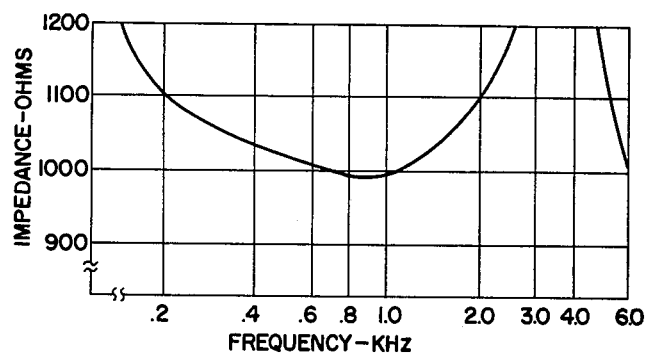
FIGS. 11a, 11b, 11c and 11d show the impedance versus frequency characteristic of a loaded transmission line before impedance transformation as well as the characteristics of the same line after the impedance transformation provided by a line-build-out capacitor and the high and low frequency correction means respectively.

Referring to FIG. 11a, there is shown the impedance vs. frequency characteristic of a loaded transmission line. From this characteristic, it is seen that in the audio frequency band (200 hz. to 3 khz.), the magnitude of the line impedance is above 900 ohms and reaches a minimum of about 1000 ohms at a frequency of approximately 1 khz. It is necessary therefore to buildout this impedance such that at all frequencies in the audio band the magnitude of the impedance presented by the line to the circuit of FIG. 9 is substantially constant and equal to 900 ohms. The necessary impedance compensation is provided by the line-build-out network 73 which is, as described above, comprised of a low and high frequency corrector circuits and in addition, where the line is terminated in a fractional section, a capacitor (C7 of FIG. 8) which is added in shunt at the subscriber end of the line. The capacitor builds out the line to an approximate full section and will be hereinafter referred to as the build-out capacitor. For purposes of illustration, it is assumed that the line is terminated in a fractional section.

Figure 11B:
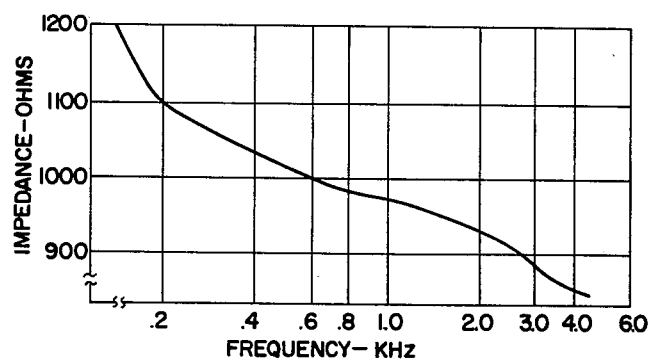
Figure 11C:
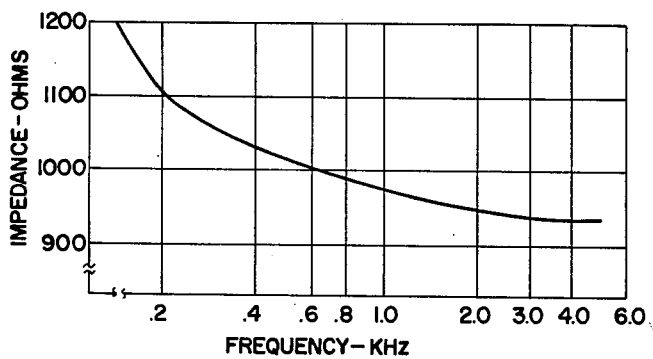

Referring to FIG. 11b, there is shown the impedance versus frequency characteristic of the loaded transmission line after the impedance compensation provided by the build out capacitor C7. As is seen from a comparison of FIG. 11b with FIG. 11a, the effect of the build-out capacitor is to cause, in the frequency range of 1 to 3 khz, the line impedance to decrease slowly with frequency. FIG. 11c illustrates the magnitude of the impedance versus frequency characteristic of the line impedance which results from the combined impedance compensation provided by the high frequency correction circuit 73a of line-build-out network 73 and the build-out capacitor C7. A comparison of FIG. 11c with FIGS. 11a and 11b, indicates that the combined impedance compensation operates to provide a line impedance whose magnitude is substantially constant and equal to 900 ohms over the upper portion of the audio frequency band. The impedance compensation which is provided by the high frequency corrector 73a acting independently of the build-out capacitor, C7, can be obtained by removing from the impedance vs. frequency characteristic of FIG. 11c, the impedance compensation provided by the build-out capacitor. In addition high frequency corrector 73a operates so as to provide compensation for the imaginary part of the line impedance which occurs in the high frequency portion of the band.

Figure 11D:
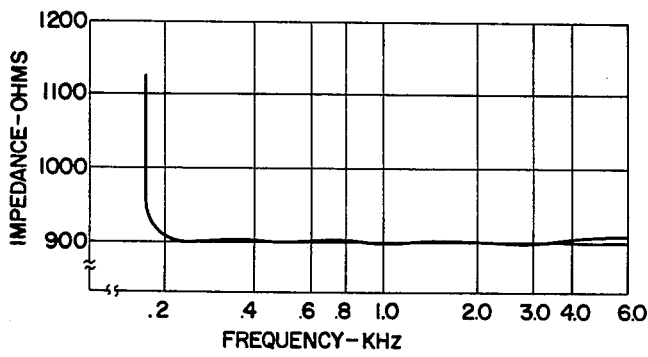

FIG. 11d illustrates as a function of frequency the impedance compensation provided by the combined effects of the low and high frequency corrector circuits, i.e., the line-build-out network 73, and the build-out capacitor C7. A comparison of FIG. 11d with FIG. 11a indicates that the low frequency correction network 73b operates to provide an impedance compensation such that the magnitude of the line impedance is substantially constant and equal to 900 ohms over the lower portion of the audio frequency band. The resultant resistive impedance vs. frequency characteristic is substantially constant and equal to 900 ohms over the entire audio frequency band. In addition line-build-out network 73 also provides phase compensation. Thus, the line-build-out network 73 and build-out capacitor C7 act in combination to thereby provide the desired correction to the frequency dependent impedance of the loaded line.

Figure 12:
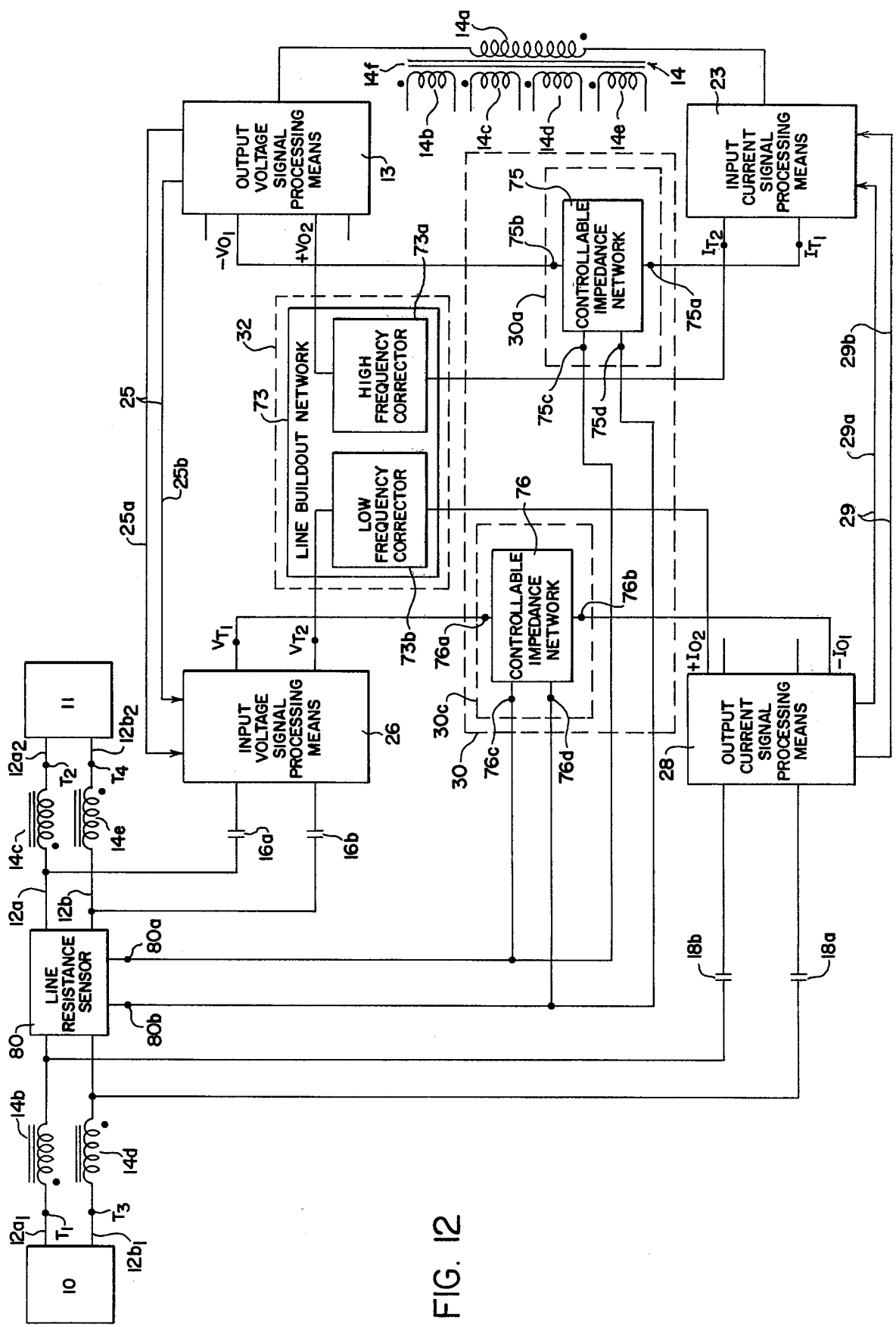
FIG. 12 is a schematic diagram showing another exemplary embodiment of FIG. 8.

To the end that the bi-section circuit of the invention shown in FIG. 8 may be used to affect the transmission characteristics of the line so as to simultaneously and independently provide gain to both the dominant and non-dominant parties which varies as a function of the a-c losses of the transmission line as well as line build-out there is shown the embodiment of FIG. 12. In FIG. 12, which is an exemplary embodiment of FIG. 8, control means 30 is connected as an impedance simulating type LCU such that the voltage $V_0$ inserted in series with the line and the current $I_0$ inserted in shunt with the line vary in accordance with the a-c losses of the line. In addition, control means 32 of FIG. 12, is also connected as an impedance simulating type LCU which functions as a frequency dependent line-build-out network 73. Control means 32 is identical in structure to and operates in the same manner as control means 32 of FIG. 9.

To simulate the presence of negative impedances which automatically adjust themselves as a function of the a-c losses of the line, control means 30 has a first controllable impedance network 75 having an input terminal 75a connected to output terminal 23b of processor 23, an output terminal 75b connected to the inverting input of terminal pair 13a of processor 13 and input terminals 75c and 75d which are connected to the output terminals 80a and 80b of line resistance sensor 80. Control means 30 has a second controllable impedance network 76 having an input terminal 76a connected to output terminal 26c of processor 26; an output terminal 76b connected to the inverting input of terminal pair 28a of processor 28 and input terminals 76c and 76d which are connected to the output terminals 80a and 80b of line resistance sensor 80.

Line resistance sensor 80, the operation of which is described in more detail below, operates so as to generate a control voltage which is proportional to the d-c resistance of the transmission line and, in turn, proportional to the a-c losses thereof. The control voltage generated by line resistance sensor 80 is applied to input terminals 75c and 75d of controllable impedance network 75 and to input terminals 76c and 76d of controllable impedance network 76 to vary the simulated series and shunt negative impedances, respectively, in accordance with the d-c resistance of the transmission line. Controllable impedance networks 75 and 76 operate in response to the control voltage so as to vary the magnitude of the voltage $V_{01}$ and the current $I_{01}$, respectively, as a function of the transmission line's d-c resistance. By so varying the magnitude of $V_{01}$ and $I_{01}$, the magnitude of the voltage, $V_0$, which is inserted in series with the transmission line and the magnitude of the current, $I_0$, which is inserted in shunt with the transmission line vary in accordance with the a-c losses of the transmission line. This variation of the magnitude of the voltage $V_0$ and the magnitude of the current $I_0$ in accordance with the a-c losses of the line allows the invention to be utilized with transmission lines of differing lengths and gauges without any field adjustments.

U.S. Pat. Nos. 3,989,906 (hereinafter the '906 patent) and 3,989,907 (hereinafter the '907 patent), the disclosures of which are hereby expressly incorporated herein by reference, show and describe alternative circuit structure for line resistance sensor 80 and controllable impedance networks 75 and 76. Another exemplary embodiment for line resistance sensor 80 is shown in the schematic diagram of FIG. 13 to be described in more detail below.

As set forth in the '906 and '907 patents, line resistance sensor 80 senses the instantaneous voltage across and the instantaneous current through the transmission line and electronically divides that voltage and that current to establish between its terminals 80a and 80b a control voltage proportional to the resistance of the transmission line. As the magnitudes of the d-c voltages and currents in a telephone transmission line are substantially greater than the magnitudes of the a-c voltages and currents therein, the instantaneous voltages and currents sensed by line resistance sensor 80 are approximately equal to the d-c voltages and currents therein. Line resistance sensor 80 may also, as will be described in connection with FIG. 13, sense the d-c voltage across and the d-c current through the transmission line to establish between its output terminals, a control voltage proportional to the length of the line. Thus, the control voltage established by line resistance sensor 80 is proportional to the d-c resistance of the transmission line and, in turn, proportional to the a-c losses thereof.

As set forth in the '906 patent for impedance simulating type LCU's, controllable impedance networks 75 and 76 may take the form of either the electronically variable resistance network described in the '906 patent and shown as the elements designated as 25' and 27' of FIG. 10 thereof, or the multiplying network described in the '907 patent and shown as the elements 25' and 27' in FIG. 6 thereof. When either of these networks are used in an impedance simulating type LCU such as is shown in FIG. 12, the application of the control voltage serves to vary the simulated series and shunt impedance generated by the impedance simulating type LCU in accordance with the d-c resistance of the transmission line. Thus, the provision of networks 80, 75 and 76 ensures that as the circuit of the invention is applied to lines with differing losses, the gain to both the dominant and non-dominant party varies without the necessity of any field adjustments as a function of the a-c losses of the lines.

While the exemplary embodiment of FIG. 12 has shown the utilization of line resistance sensing in conjunction with an impedance simulating type LCU it should be appreciated that such line resistance sensing may also be used in conjunction with an amplifying type LCU. The amplifying type LCU would also be comprised of the controllable impedance networks 75, 76 shown in FIG. 12, with network 75 coupled between the appropriate terminals of processors 23 and 28 and network 76 coupled between the appropriate terminals of processors 26 and 13. The d-c control voltage generated by sensor 80 would then serve to automatically vary the series gain and the shunt gain of the amplifying type LCU in accordance with the d-c resistances of the line. For the amplifying type LCU, network 75 and 76 may take the form of the electronically variable resistance networks described in the '906 patent and shown as the elements 30a'' and 30b'' of FIG. 6 thereof, or the multiplying networks described in the '907 patent and shown as the elements 39a and 39b of FIG. 2, thereof.

Figure 13:
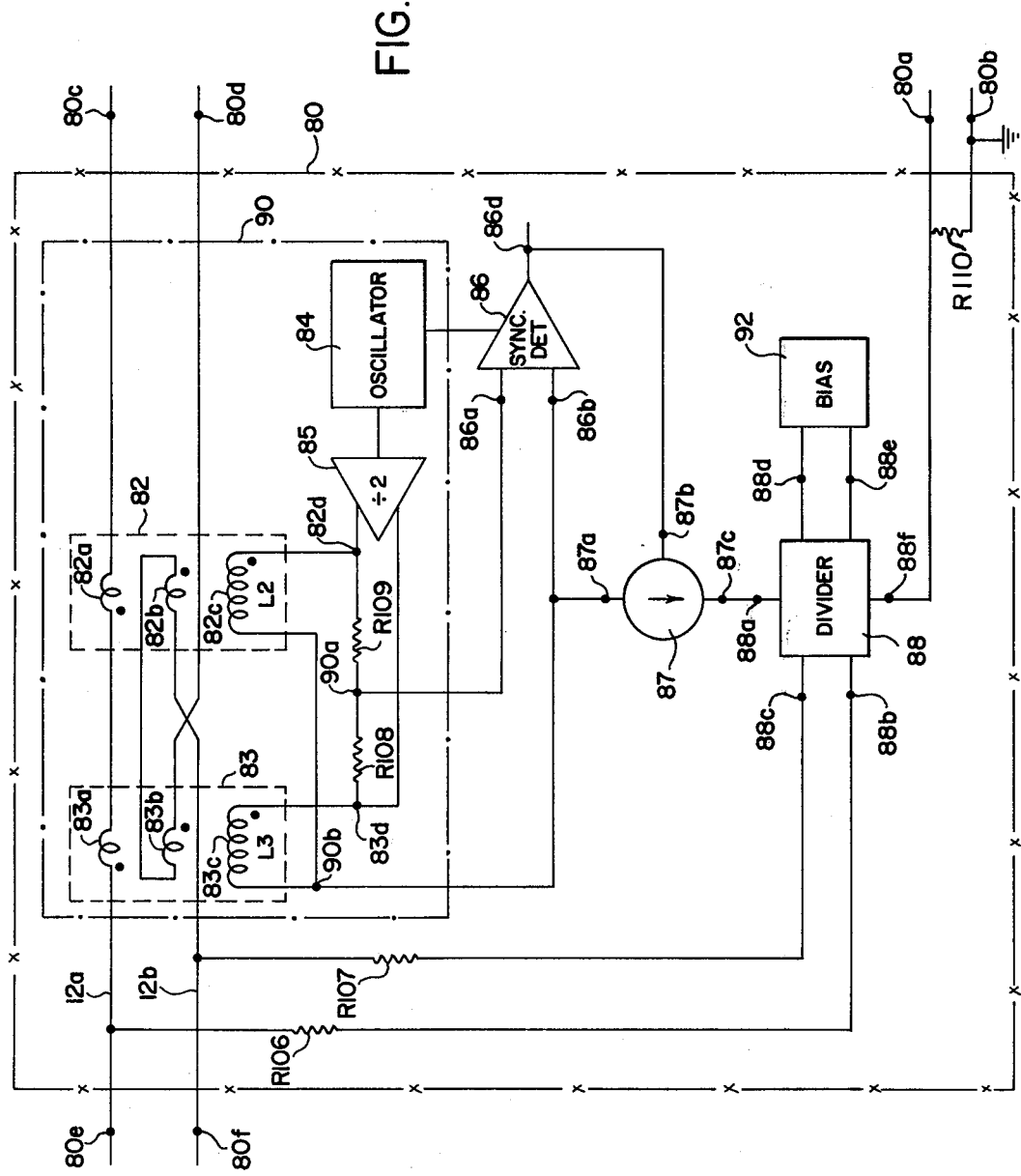
FIG. 13 is a schematic diagram of an exemplary embodiment of the line resistance sensor shown in FIG. 12.

Referring to FIG. 13 there is shown a schematic diagram of another exemplary embodiment for line resistance sensor 80. For the embodiment of FIG. 13, line resistance sensor 80 senses the d-c voltage across and the d-c current through the transmission line and electronically divides that voltage and current to establish between the sensors output terminals 80a and 80b, a control voltage which is proportional to the d-c resistance of the transmission line.

In order to sense the d-c voltage of the transmission line, sensor 80 includes resistor R106 which is connected at one end to line conductor 12a and resistor R107 which is connected at one end to line conductor 12b. The opposite ends of resistors R106 and R107 are connected to inputs 88b and 88c, respectively, of divider 88. As a result of the action of resistors R106 and R107 a differential current, which is proportional in magnitude to and has the same polarity as the d-c voltage of the line, appears at divider terminals 88b and 88c.

In order to sense the d-c loop current of the transmission line, sensor 80 includes second harmonic magnetic modulator 90, synchronous detector 86 and current source 87. As will be described in more detail below, magnetic modulator 90 operates so as to establish at output terminals 90a and 90b thereof, a voltage which is related to the d-c current in the line. This voltage is connected to inputs 86a and 86b of detector 86. Detector 86, whose output 86d is connected to input 87b of current source 87, operates so as to cause the current at outputs 87a and 87c of current source 87 to have a magnitude proportional to the d-c loop current of the transmission line. The current at output 87a has a polarity which is opposite to that of the transmission line d-c loop current, whereas the current at output 87c has the same polarity as the transmission line d-c loop current. The current at output 87a, as will be described below, opposes the magnetic field set up by the d-c loop current. Output 87c of source 87 is connected to input 88a of divider 88. Thus, a current proportional in magnitude to and having the same polarity as the d-c current of the line appears at input terminal 88a of divider 88.

Divider 88 electronically divides the current proportional in magnitude to the d-c voltage of the line which appears at inputs 88b and 88c thereof by the current proportional in magnitude to the d-c current of the line which appears at input terminal 88a thereof to produce at output 88f a current where absolute value is proportional in magnitude to the d-c resistance of the line. By the action of resistor R110, a voltage which is proportional to the d-c resistance of the line appears across output terminals 80a and 80b of line resistance sensor 80. The necessary biasing and scaling reference for the divider 80 is provided at input terminals 88d and 88e thereof by bias source 92. Thus, line resistance sensor 80 provides at output terminals 80a and 80b thereof a voltage whose absolute value is proportional to the d-c resistance of the line.

The operation of magnetic modulator 90, synchronous detector 86 and current source 87 will now be described.

Magnetic modulator 90 includes first winding unit L2, designated as 82, second winding unit, L3, designated as 83, sawtooth wave oscillator 84, divider and squarer 85 and resistors R108 and R109. First and second winding units L2 and L3 are identical in structure and each comprise a multi-turn coil (82c for L2 and 83c for L3), first single turn coil (82a for L2 and 83a for L3) connected to transmission line conductor 12a and second single turn coil (82b for L2 and 83b for L3) connected to line conductor 12b.

Modulator 90 operates, in the presence of d-c loop current flow in the transmission line, to produce a voltage across terminals 90a and 90b thereof. First and second single turn coils 82a, 83a and 82b, 83b, respectively, are therefore connected to the transmission line in a manner so as to reject the effect of common mode current, i.e., current flowing in the same direction in line conductors 12a and 12b. As can be seen from FIG. 13, for the coils dotted as shown, common mode current flowing from station 10 to station 11 in conductors 12a and 12b produces equal and opposite and therefore cancelling magnetic fields in coils 82a, 82b and in coils 83a, 83b. Similarly, common mode current flowing from station 11 to station 10 produces equal and opposite and therefore cancelling magnetic fields in coils 82a, 82b and in coils 83a, 83b. Loop current, whether flowing from station 10 to station 11 in upper conductor 12a and from station 11 to station 10 in lower conductor 12b or vice versa, produces additive magnetic fields in coils 82a, 82b and in coils 83a, 83b.

Multiturn coils 82c and 83c are driven by a signal which is derived from the output signal generated by oscillator 84. Oscillator 84 generates a sawtooth wave form which is divided in frequency by a factor of two and shaped into a square wave by divider 85. Divider 85 provides two square waves which are of the same frequency but opposite in polarity, one of the square waves being used to drive coil 82c and the other being used to drive coil 83c. In the absence of d-c loop current flow in the transmission line, coils 82c and 83c are both, assuming ideal coils, simultaneously driven into saturation during each half cycle of the square wave. For these conditions the output of the modulator across terminals 90a and 90b thereof is then zero volts.

The operation of sensor 80 in the presence of d-c loop current will now be described. For purposes of the description, it is assumed that the square wave signal generated by divider 85 varies between a positive voltage and zero volts and that for the present half cycle coil 82c is being driven by the positive voltage and coil 83c is at zero volts. It is further assumed that d-c loop current is flowing in conductor 12a from station 10 to station 11 and in conductor 12b from station 11 to station 10. It should be understood that sensor 80 operates in the same manner for loop current whose direction of flow is opposite to that described above, the only difference being the polarity of the signal generated by modulator 90.

With the coils comprising L2 and L3 dotted as shown in FIG. 13, the effect of the loop current flow described above is to aid the saturation of L2 and oppose the saturation of L3. In aiding saturation the d-c loop current causes L2 to saturate sooner in time than the time L2 takes to saturate in the absence of d-c loop current. In opposing saturation, the d-c loop current causes L3 to saturate later in time, than the time L3 takes to saturate in the absence of d-c loop current. Although the d-c loop current opposes the saturation of L3, L3 still saturates as the number of turns in coil 83c and therefore the magnetic field thereof is much greater than the opposing magnetic field developed by the single turn coils 83a and 83b. Further, both L2 and L3 reach saturation within the time of a half cycle of the square wave generated by divider 85. Thus, for the d-c loop current flowing as described above, the total magnetic field developed by L2 in the presence of loop current is greater than the total magnetic field developed by L2 in the absence of loop current and the total magnetic field developed by L3 in the presence of loop current is less than the total magnetic field developed by L3 in the absence of loop current.

In addition, as the loop current aids the saturation of L2, the total drive voltage in L2 is higher than the drive voltage present in the unit in the absence of loop current. The time for saturation in the presence of loop current is, however, less than the time for saturation in the absence of loop current. If curves of drive voltage versus time were to be drawn for L2, the area (volt second product) under the curve generated in the absence of loop current would equal the area under the curve generated in the presence of loop current. As the loop current opposes the saturation of L3, the total drive voltage in L3 is lower than the drive voltage present in the unit in the absence of loop current. The time for saturation in the presence of loop current is, however, more than the time for saturation in the absence of loop current. If curves of drive voltage versus time were drawn for L3, the area (volt second product) under the curve generated in the absence of loop current would equal the area under the curve generated in the presence of loop current. If both L2 and L3 were identical ideal units, the areas under their respective curves of drive voltage versus time would be equal.

Prior to saturation of either L2 or L3, the voltage drop across L2 is greater than the voltage drop across L3, thereby causing output terminal 90b of modulator 90 to be negative with respect to output terminal 90a thereof. As L2 enters saturation its associated drive voltage decreases and eventually reaches zero. The drive voltage for L3 remains substantially constant during this time interval. When the drive voltage for L2 decreases so as to be equal to the drive voltage for L3, the voltage across terminals 90a and 90b rises to zero volts. For the time interval between the saturation of L2 and the saturation of L3, terminal 90b of modulator 90 becomes positive with respect to terminal 90a thereof. As this time interval is small, the voltage wave form across terminals 90a and 90b can be represented by a positive peak. The area under the negative portion of the wave form of voltage versus time of the voltage appearing at terminals 90a, 90b is equal to the area under the positive portion of the wave form.

During the next half cycle of the voltage generated by driver 85, i.e. with coil 82c being driven by 0 volts and coil 83c being driven by a positive voltage, a voltage having a wave form identical to that described above will appear across terminals 90a and 90b. Thus, the voltage appearing across terminals 90a and 90b has a frequency equal to the frequency of the sawtooth wave form generated by oscillator 84.

For loop current flow opposite to the direction of current flow described above, a voltage will appear across terminals 90a and 90b which will be identical in shape to the voltage described above, but be opposite in polarity. This voltage will also have a frequency equal to the frequency of the sawtooth wave form generated by oscillator 84.

The output voltage appearing across terminals 90a and 90b is coupled to synchronous detector 86. Detector 86, which in addition has an input connected to oscillator 84, functions so as to provide a wave format output 86d thereof whose polarity is determined by the initial polarity of the voltage appearing across terminals 90a and 90b. In effect, detector 86 rectifies the positive or negative peak associated with the output voltage appearing across terminals 90a and 90b to generate a voltage with waveform whose volt second product is proportional to the magnitude of the d-c loop current and whose polarity is the same as the polarity of the d-c loop current.

Current source 87 whose input is coupled to output 86d of detector 86 is then driven by the signal appearing at output 86d of detector 86 to provide at output 87c thereof a signal whose magnitude is proportional to and whose polarity is the same as the magnitude and polarity of the d-c loop current. Output 87c of current source 87 is coupled to input 88a of divider 88. Current source 87 also provides in response to the output signal of detector 86, a current signal at output 87a thereof whose magnitude is proportional to and whose polarity is opposite to the magnitude and polarity of the d-c loop current. This current opposes the effect of the d-c loop current on the saturation of L2 and L3 to thereby develop a null at outputs 90a and 90b of modulator 90.

In a typical circuit arrangement for the line resistance sensor 80 described above, winding units L2 and L3 comprise toroidal cores each having multiturn coils 82c and 83c of 600 turns. Resistors R106 and R107 each have a resistance of 2 megohms, resistors R108 and R109 each have a resistance of 5.62 kilohms and resistor R110 has a resistance of 5110 ohms.

It should further be appreciated that while the use of line resistance sensing has been described in connection with the bi-section exemplary embodiment of the invention shown in FIG. 12, such line resistance sensing may also be used in conjunction with any of the LCU's comprising the tri-section exemplary embodiments of FIGS. 5 and 6.

In view of the foregoing, it will be seen that a multi-section apparatus constructed in accordance with the present invention is adapted to provide a single voltage in series with a transmission line and a single current in shunt with the transmission line which voltage and current provide a mutliplicity of independent non-interactive effects on the charactertistics of the transmission line. In addition, the circuit of the invention is adapted to provide such effects as a result of any combination of either impedance simulating type LCU's and/or amplifying type LCU's.

It will be understood that the number of sections comprising an apparatus constructed in accordance with the present invention is not important to the operation of the invention provided that the apparatus is multi-sectioned, i.e., has two or more sections. In addition, for an apparatus of a given number of sections, the number of components in any LCU is not important to the invention since the number and type of components is determined by the desired effect on the line. Further, for an apparatus of a given number of sections, the number of feedback paths between the output voltage and input voltage processors 26 and 13 and the number of feedback paths between the output current and input current processors 23 and 28 is always equal to the number of sections contained in the apparatus.

It will be understood that the embodiments shown herein are for illustrative purposes only and may be changed or modified without departing from the spirit and scope of the present invention as set forth in the appended claims.

What is claimed is:

1. In an apparatus for producing simultaneously a multiplicity of independent non-interactive effects in the transmission characteristics of a transmission line, the combination of:

(a) output voltage signal processing means for generating an output voltage, said output voltage being applied in series with said transmission line, and for generating a plurality of feedback signals, the signal processing means having a plurality of inputs, a first output associated with said output voltage and a plurality of second outputs each associated with a respective feedback signal, each of said feedback signals being dependent upon the signal at a respective input;

(b) output current signal processing means for generating an output current, said output current being applied in shunt with said transmission line, and for generating a plurality of feedback signals, the signal processing means having a plurality of inputs, a first output associated with said output current and a plurality of second outputs each associated with a respective feedback signal, each of said feedback signals being dependent upon the signal at a respective input;

(c) input voltage signal processing means responsive to the signal voltage across said line and to said output voltage processing means feedback signals for generating a plurality of output signals, each of said output signals being dependent upon said signal voltage and upon predetermined ones of said feedback signals, the signal processing means having a plurality of feedback inputs each associated with a respective one of said feedback signals and a plurality of outputs each associated with a respective one of said output signals;

(d) input current signal processing means responsive to the signal current through said line and to said output current processing means feedback signals for generating a plurality of output signals, each of said output signals being dependent upon said signal current and upon predetermined ones of said feedback signals, the signal processing means having a plurality of feedback inputs each associated with a respective one of said feedback signals and a plurality of outputs each associated with a respective one of said output signals;

(e) a plurality of line conditioning control means responsive to the output signals of said input voltage processing means and to the output signals of said input current processing means, each of said conditioning control means having at least one input associated with a respective one of the outputs of one of said input processing means, and at least one output associated with a respective one of the inputs of one of said output processing means;

(f) means for connecting said inputs of said line conditioning control means to said outputs of said input processing means; and (g) means for connecting said outputs of said line conditioning control means to said inputs of said output processing means, whereby said multiplicity of independent non-interactive simultaneous effects in the transmission characteristics are produced.

2. An apparatus as set forth in claim 1 wherein each of said inputs to said output processing means has an inverting terminal and a non-inverting terminal.

3. An apparatus as set forth in claim 2 wherein each of said line conditioning control means has two inputs, one of said inputs associated with a respective one of the outputs of said input voltage processing means and the other of said inputs associated with a respective one of the outputs of said input current processing means.

4. An apparatus as set forth in claim 3 wherein each of said line conditioning control means has two outputs, one of said outputs associated with a respective one of the inputs of said output voltage processing means and the other of said outputs associated with a respective one of the inputs of said output current processing means.

5. An apparatus as set forth in claim 4 wherein each of said input processing means has three outputs and three feedback inputs and each of said output processing means has three inputs and three feedback outputs.

6. An apparatus as set forth in claim 5 wherein said plurality of line conditioning control means is three.

7. An apparatus as set forth in claim 6 wherein one of said line conditioning control means includes impedance control means for simulating the presence of positive impedances in said line, said impedance control means connected between one of the outputs of one of said input processing means and the non-inverting terminal of one of the inputs of a dissimilar one of said output processing means.

8. An apparatus as set forth in claim 7 wherein another of said line conditioning control means includes impedance control means for simulating the presence of positive impedances in said line, said impedance control means connected between another of the outputs of one of said input processing means and the non-inverting terminal of another of the inputs of a dissimilar one of said output processing means.

9. An apparatus as set forth in claim 8 wherein the remaining line conditioning control means includes gain control means for increasing the amplitude of signal transmission through said transmission line, said gain control means connected between the remaining output of one of said input processing means and the inverting and non-inverting terminals of the remaining input of a similar one of said output processing means.

10. An apparatus as set forth in claim 9 wherein said gain control means includes directional control means for connecting said remaining output of one of said input processing means to said non-inverting terminal of the remaining input of said similar output processing means when dominant signals are transmitted in a first direction through the transmission line and to the inverting terminal of the remaining input when dominant signals are transmitted in a second direction through said transmission line.

11. An apparatus as set forth in claim 9 wherein said input voltage signal processing means comprises voltage sensing means having an input coupled to said line for generating a signal which varies in accordance with the signal voltage across said line and voltage generating means responsive to said sensing means generated signal and said output voltage processing means feedback signals for generating said output signals and said input current signal processing means comprises current sensing means having an input coupled to said line for generating a signal which varies in accordance with the signal current through said line and current generating means responsive to said sensing means generated signal and said output current processing means feedback signals for generating said output signals.

12. An apparatus as set forth in claim 11 further comprising directional detection means responsive to said voltage sensing means generated signal and said current sensing means generated signal for generating a first output when dominant signals are transmitted in said first direction through said line and a second output when dominant signals are transmitted in said second direction through said line and means for connecting said first and second outputs to said gain control means.

13. An apparatus as set forth in claim 9 wherein said gain control means has a first operative state in which signals transmitted from a first end of the transmission line are amplified, a second operative state in which signals transmitted from a second end of the transmission line are amplified and which includes means for controlling the operative state of said gain control means in accordance with the dominant direction of transmission through the transmission line.

14. An apparatus as set forth in claim 6 wherein one of said line conditioning control means includes impedance control means for simulating the presence of negative impedances in said line, said impedance control means connected between one of the outputs of one of said input processing means and an inverting terminal of one of the inputs of a dissimilar one of said output processing means.

15. An apparatus as set forth in claim 14 wherein another of said line conditioning control means includes impedance control means for simulating the presence of positive impedances in said line, said impedance control means connected between another of the outputs of one of said input processing means and a non-inverting terminal of another of the inputs of a dissimilar one of said output processing means.

16. An apparatus as set forth in claim 15 wherein the remaining line conditioning control means includes gain control means for increasing the amplitude of signal transmission through said transmission line, said gain control means connected between the remaining output of one of said input processing means and the inverting and non-inverting terminals of the remaining input of a similar one of said output processing means.

17. An apparatus as set forth in claim 16 wherein said gain control means includes directional control means for connecting said remaining output of one of said input processing means to said non-inverting terminal of the remaining input of said similar output processing means when dominant signals are transmitted in a first direction through said transmission line and to the inverting terminal of the remaining input when dominant signals are transmitted in a second direction through said transmission line.

18. An apparatus as set forth in claim 17 wherein said gain control means further includes frequency compensating means for varying the amplitudes of the signals at the inverting and non-inverting terminals of the remaining input of a similar one of said output processing means.

19. An apparatus as set forth in claim 18 wherein said frequency compensating means includes signal peaking means for increasing the gains of said directional control means, as functions of frequency, as the frequency of signal transmission rises toward a predetermined frequency and for decreasing the gains of said directional control means, as functions of frequency, as the frequency of signal transmission rises above said predetermined frequency.

20. An apparatus as set forth in claim 16 wherein said gain control means has a first operative state in which signals transmitted from a first end of the transmission line are amplified, a second operative state in which signals transmitted from a second end of the transmission line are amplified and which includes means for controlling the operative states of said gain control means in accordance with the dominant direction of transmission through said transmission line.

21. An apparatus as set forth in claim 16 wherein said input voltage signal processing means comprises voltage sensing means having an input coupled to said line for generating a signal which varies in accordance with the signal voltage across said line and voltage generating means responsive to said sensing means generated signal and said output voltage processing means feedback signals for generating said output signals and said input current signal processing means comprises current sensing means having an input coupled to said line for generating a signal which varies in accordance with the signal current through said line and current generating means responsive to said sensing means generated signal and said output current processing means feedback signals for generating said output signals.

22. An apparatus as set forth in claim 21 further comprising directional detection means responsive to said voltage sensing means generated signal and said current sensing means generated signal for generating a first output when dominant signals are transmitted in said first direction through said line and a second output when dominant signals are transmitted in said second direction through said line and means for connecting said first and second outputs to said gain control means.

23. An apparatus as set forth in claim 4 wherein said input voltage processing means has two outputs, said input current processing means has two outputs, said output voltage processing means has two inputs and two feedback signals and said output current processing means has two inputs and two feedback signals.

24. An apparatus as set forth in claim 23 wherein said plurality of line conditioning control means is two.

25. An apparatus as set forth in claim 24 wherein one of said line conditioning control means includes impedance control means for simulating the presence of positive impedances in said line, said impedance control means connected between one of the outputs of one of said input processing means and the non-inverting terminal of one of the inputs of a dissimilar one of said output processing means.

26. An apparatus as set forth in claim 25 wherein the other of said line conditioning control means includes impedance control means for simulating the presence of negative impedances in said line, said impedance control means connected between the other of the outputs of one of said input processing means and the inverting terminal of the other of the inputs of a dissimilar one of said output processing means.

27. An apparatus as set forth in claim 26 wherein said impedance control means included in said other line conditioning control means includes low frequency corrector means connected between the other of the outputs of said input voltage processing means and the non-inverting terminal of one of the inputs of said output current signal processing means and high frequency corrector means connected between the other of the outputs of said input current signal processing means and the non-inverting terminal of one of the inputs of said output voltage signal processing means.

28. An apparatus as set forth in claim 24 further including line resistance sensing means responsive to the signal voltage across said line and the signal current through said line for generating a control signal proportional to the a–c losses of the line.

29. An apparatus as set forth in claim 28 wherein one of said line conditioning control means includes controllable impedance means responsive to said control signal for simulating the presence of negative impedances, which vary in accordance with the a–c losses of said line, in said line said controllable impedance means connected between one of the outputs of one of said input processing means and the inverting terminal of the other of the inputs of a dissimilar one of said output processing means.

30. In an apparatus for modifying the characteristics of a transmission line, the combination of:

(a) output voltage signal processing means for generating an output voltage, said output voltage being applied in series with said transmission line, and for generating a plurality of feedback signals, the signal processing means having a plurality of inputs, a first output associated with said output voltage and a plurality of second outputs each associated with a respective feedback signal, each of said feedback signals being dependent upon the signal at a respective input;

(b) output current signal processing means for generating an output current, said output current being applied in shunt with said transmission line, and for generating a plurality of feedback signals, the signal processing means having a plurality of inputs, a first output associated with said output current and a plurality of second outputs each associated with a respective feedback signal, each of said feedback signals being dependent upon the signal at a respective input;

(c) input voltage signal processing means responsive to the signal voltage across said line and to said output voltage processing means feedback signals for generating a plurality of output signals, each of said output signals being dependent upon said signal voltage and upon predetermined ones of said feedback signals, the signal processing means having a plurality of feedback inputs each associated with a respective one of said feedback signals and a plurality of outputs each associated with a respective one of said output signals;

(d) input current signal processing means responsive to the signal current through said line and to said output current processing means feedback signals for generating a plurality of output signals, each of said output signals being dependent upon said signal current and upon predetermined ones of said feedback signals, the signal processing means having a plurality of feedback inputs each associated with a respective one of said feedback signals and a plurality of outputs each associated with a respective one of said output signals;

(e) a plurality of gain control means for increasing the amplitude of signal transmission through said transmission line, each of said gain control means associated with a respective one of the outputs of one of said input processing means and a respective one of the inputs of a similar one of said output processing means;

(f) a plurality of impedance control means for simulating the presence of impedances in said line, each of said impedance control means associated with a respective one of the outputs of one of said input processing means and a respective one of the inputs of a dissimilar one of said output processing means;

(g) means for connecting said gain control means between similar ones of said input processing means and said output processing means; and (h) means for connecting said impedance control means between dissimilar ones of said input processing means and said output processing means.

31. An apparatus as set forth in claim 30 wherein each of said inputs to said output processing means has an inverting terminal and a non-inverting terminal.

32. An apparatus as set forth in claim 31 wherein said input voltage processing means has three outputs and three feedback inputs, said input current processing means has three outputs and three feedback inputs, said output voltage processing means has three inputs and three feedback outputs and said output current processing means has three inputs and three feedback outputs.

33. An apparatus as set forth in claim 32 wherein said plurality of gain control means is two, both of said gain control means connected between one of the outputs of one of said input processing means and the inverting terminal and non-inverting terminal of one of the inputs of a similar one of said output processing means.

34. An apparatus as set forth in claim 33 wherein each of said gain control means has a first operative state in which signals transmitted from a first end of the transmission line are amplified, a second operative state in which signals transmitted from a second end of the transmission line are amplified and which includes means for controlling the operative state of said gain control means in accordance with the dominant direction of transmission through said transmission line.

35. An apparatus as set forth in claim 33 wherein said plurality of impedance control means is four, two of said impedance control means connected between another of the outputs of one of said input processing means and the non-inverting terminal of another of the inputs of a dissimilar one of said output processing means and the remaining two of said impedance control means connected between the remaining output of one of said input processing means and the non-inverting terminal of the remaining input of said dissimilar one of said output processing means.

36. An apparatus as set forth in claim 33 wherein each of said gain control means includes directional control means for connecting said output of one of said input processing means to said non-inverting terminal of said similar one of said output processing means when dominant signals are transmitted in a first direction through said transmission line and to the inverting terminal when dominant signals are transmitted in a second direction through said transmission line.

37. An apparatus as set forth in claim 36 wherein each of said gain control means further includes frequency compensating means for varying the amplitude of the signals at the inverting and non-inverting terminals of said similar one of said output processing means.

38. An apparatus as set forth in claim 33 wherein said plurality of impedance control means is four, the first of said impedance control means connected between another of the outputs of one of said input processing means and the inverting terminal of another of the inputs of one of said dissimilar output processing means, the second of said impedance control means connected between another of the outputs of the other of said input processing means and the non-inverting terminal of another of the inputs of the other of said dissimilar output processing means, the third of said impedance control means connected between the remaining output of one of the input processing means and the inverting terminal of the remaining one of the inputs of one of said dissimilar output processing means and the fourth of said impedance control means connected between the remaining output of the other of the input processing means and the non-inverting terminal of the remaining one of the inputs of the other of said dissimilar output processing means.

39. An apparatus as set forth in claim 31 wherein said input voltage processing means has two outputs and two feedback inputs, said input current processing means has two outputs and two feedback inputs, said output voltage processing means has two inputs and two feedback outputs and said output current processing means has two inputs and two feedback outputs.

40. An apparatus is set forth in claim 39 wherein said plurality of impedance control means is four.

41. In an apparatus for producing simultaneously two independent non-interactive effects in the transmission characteristics of a transmission line, the combination of:

(a) output voltage signal processing means for generating an output voltage, said output voltage being applied in series with said transmission line, and for generating two feedback signals, the signal processing means having two inputs, a first output associated with said output voltage and two second outputs each associated with a respective feedback signal, each of said feedback signals being dependent upon the signal at a respective input;

(b) output current signal processing means for generating an output current, said output current being applied in shunt with said transmission line, and for generating two feedback signals, the signal processing means having two inputs, a first output associated with said output current and two second outputs each associated with a respective feedback signal, each of said feedback signals being dependent upon the signal at a respective input;

(c) input voltage signal processing means responsive to the signal voltage across said line and to said output voltage processing means feedback signals for generating two output signals, each of said output signals being dependent upon said signal voltage and upon predetermined ones of said feedback signals, the signal processing means having two feedback inputs each associated with a respective one of said feedback signals and two outputs each associated with a respective one of said output signals;

(d) input current signal processing means responsive to the signal current through said line and to said output current processing means feedback signals for generating two output signals, each of said output signals being dependent upon said signal current and upon predetermined ones of said feedback signals, the signal processing means having two feedback inputs each associated with a respective one of said feedback signals and two outputs each associated with a respective one of said output signals;

(e) two line conditioning control means each responsive to the output signals of said input voltage processing means and the output signals of said input current processing means, each of said line conditioning control means having two inputs and two outputs, one of said inputs associated with one of the outputs of said input voltage processing means and the other of said inputs associated with one of the outputs of said input current processing means and one of said outputs associated with one of the inputs of said output voltage processing means and the other of said outputs associated with one of the inputs of said output current processing means; and (f) means for connecting the inputs and outputs of said conditioning control means to said outputs and inputs of said input and output processing means, whereby said two independent non-interactive simultaneous effects in the transmission characteristics are provided.

42. An apparatus as set forth in claim 41 wherein each of said inputs of said output processing means having an inverting terminal and a non-inverting terminal.

43. In an apparatus for producing simultaneously three independent non-interactive effects in the transmission characteristics of a transmission line, the combination of:

(a) output voltage signal processing means for generating an output voltage, said output voltage being applied in series with said transmission line, and for generating three feedback signals, the signal processing means having three inputs, a first output associated with said output voltage and three second outputs each associated with a respective feedback signal, each of said feedback signals being dependent upon the signal at a respective input;

(b) output current signal processing means for generating an output current, said output current being applied in shunt with said transmission line, and for generating three feedback signals, the signal processing means having three inputs, a first output associated with said output current and three second outputs each associated with a respective feedback signal, each of said feedback signals being dependent upon the signal at a respective input;

(c) input voltage signal processing means responsive to the signal voltage across said line and to said output voltage processing means feedback signals for generating three output signals, each of said output signals being dependent upon said signal voltage and upon predetermined ones of said feedback signals, the signal processing means having three feedback inputs each associated with a respective one of said feedback signals and three outputs each associated with a respective one of said output signals;

(d) input current signal processing means responsive to the signal current through said line and to said output current processing means feedback signals for generating three output signals, each of said output signals being dependent upon said signal current and upon predetermined ones of said feedback signals, the signal processing means having three feedback inputs each associated with a respective one of said feedback signals and three outputs each associated with a respective one of said output signals;

(e) three line conditioning control means each responsive to the output signals of said input voltage processing means and the output signals of said input current processing means, each of said line conditioning control means having two inputs and two outputs, one of said inputs associated with one of the outputs of said input voltage processing means and the other of said inputs associated with one of the outputs of said input current processing means and one of said outputs associated with one of the inputs of said output voltage processing means and the other of said outputs associated with one of the inputs of said output current processing means; and (f) means for connecting the inputs and outputs of said conditioning control means to said outputs and inputs of said input and output processing means, whereby said three independent non-interactive simultaneous effects in the transmission characteristics are provided.

44. An apparatus as set forth in claim 43 wherein each of said inputs of said output processing means having an inverting terminal and a non-inverting terminal.

45. In an apparatus for modifying the characteristics of a telephone transmission line, the combination of:

(a) output voltage signal processing means having first and second input signals for generating an output voltage for insertion in the transmission line and first and second feedback signals each of said feedback signals being a predetermined function of said input signals, the output voltage processing means having first and second input means each associated with a respective one of said input signals, a first output means associated with said output voltage and first and second feedback output means each associated with a respective one of said feedback signals;

(b) output current signal processing means having first and second input signals for generating an output current for insertion in the transmission line, and first and second feedback signals, each of said feedback signals being a predetermined function of said input signals, the output current processing means having first and second input means each associated with a respective one of said input signals, a first output means associated with said output current and first and second feedback output means associated with a respective one of said feedback signals;

(c) input voltage signal processing means responsive to the signal voltage across said line and said output voltage processing means feedback signals for generating first and second output signals each of said output signals being dependent upon said signal voltage and upon predetermined ones of said feedback signals, the input voltage processing means having first and second feedback input means each associated with a respective one of said feedback signals and first and second output means each associated with a respective one of said output signals;

(d) input current signal processing means responsive to the signal current through said line and said output current processing means feedback signals for generating first and second output signals each of said output signals being dependent upon said signal current and upon predetermined ones of said feedback signals, the input current processing means having first and second feedback input means each associated with a respective one of said feedback signals and first and second output means each associated with a respective one of said output signals;

(e) means for applying the voltage at the first output means of the output voltage processing means in series with the transmission line;

(f) means for applying the current at the first output means in shunt with the transmission line;

(g) means for generating a control signal proportional to the a-c losses of the transmission line;

(h) a first impedance simulating control means responsive to said input current processing means first output signal for generating a first input signal, said first impedance simulating control means being associated with said output voltage processing means first input means and including first control signal responsive means for establishing a signal dependent upon the product of the control signal and the input current processing means first output signal, the magnitude of said first input signal varying in accordance with said product;

(i) a second impedance simulating control means responsive to said input current processing means second output signal, said second impedance simulating control means being associated with said output voltage processing means second input means;

(j) first and second connecting means associated with said first and second impedance simulating control means respectively for connecting said impedance simulating control means to said output voltage processing means to vary the magnitude of the output voltage in accordance with the input current processing means first and second output signals;

(k) third impedance simulating control means responsive to said input voltage processing means first output signal for generating a first input signal, said third impedance simulating control means being associated with said output current processing means first input means and including second control signal responsive means for establishing a signal dependent upon the product of the control signal and the input voltage processing means first output signal, the magnitude of said first input signal varying in accordance with said product;

(l) a fourth impedance simulating control means responsive to said input voltage processing means second output signal, said fourth impedance simulating control means being associated with said output current processing means second input means; and (m) third and fourth connecting means associated with said third and fourth impedance simulating control means respectively for connecting said impedance simulating control means to said output current processing means to vary the magnitude of the output current in accordance with the input voltage processing means first and second output signals.

46. In an apparatus for producing simultaneously a multiplicity of independent non-interactive effects in the transmission characteristics of a transmission line, the combination of:

(a) output voltage signal processing means for generating an output voltage, said output voltage being applied in series with said transmission line, and for generating a plurality of feedback voltages, the signal processing means having a plurality of inputs, a first output associated with said output voltage and a plurality of second outputs each associated with a respective feedback voltage, each of said feedback voltages being dependent upon the voltage at a respective input;

(b) output current signal processing means for generating an output current, said output current being applied in shunt with said transmission line, and for generating a plurality of feedback voltages, the signal processing means having a plurality of inputs, a first output associated with said output current and a plurality of second outputs each associated with a respective feedback voltage, each of said feedback voltages being dependent upon the voltage at a respective input;

(c) input voltage signal processing means responsive to the signal voltage across said line and to said output voltage processing means feedback voltages for generating a plurality of output voltages, each of said output voltages being dependent upon said signal voltage and upon predetermined ones of said feedback voltages, the signal processing means having a plurality of feedback inputs each associated with a respective one of said feedback voltages and a plurality of outputs each associated with a respective one of said output voltages;

(d) input current signal processing means responsive to the signal current through said line and to said output current processing means feedback voltages for generating a plurality of output voltages, each of said output voltages being dependent upon said signal current and upon predetermined ones of said feedback voltages, the signal processing means having a plurality of feedback inputs each associated with a respective one of said feedback voltages and a plurality of outputs each associated with a respective one of said output voltages;

(e) a plurality of line conditioning control means responsive to the output voltages of said input voltage processing means and to the output voltages of said input current processing means, each of said conditioning control means having at least one input associated with a respective one of the outputs of one of said input processing means, and at least one output associated with a respective one of the inputs of one of said output processing means;

(f) means for connecting said inputs of said line conditioning control means to said outputs of said input processing means; and (g) means for connecting said outputs of said line conditioning control means to said inputs of said output processing means, whereby said multiplicity of independent non-interactive simultaneous effects in the transmission characteristics are produced.

47. In an apparatus for producing simultaneously three independent non-interactive effects in the transmission characteristics of a transmission line, the combination of:

(a) output voltage signal processing means for generating an output voltage, said output voltage being applied in series with said transmission line, and for generating three feedback voltages, the signal processing means having three inputs, a first output associated with said output voltage and three second outputs each associated with a respective feedback voltage, each of said feedback voltages being dependent upon the voltage at a respective input;

(b) output current signal processing means for generating an output current, said output current being applied in shunt with said transmission line, and for generating three feedback voltages, the signal processing means having three inputs, a first output associated with said output current and three second outputs each associated with a respective feedback voltage, each of said feedback voltages being dependent upon the voltage at a respective input;

(c) input voltage signal processing means responsive to the signal voltage across said line and to said output voltage processing means feedback voltages for generating three output voltages, each of said output voltages being dependent upon said signal voltage and upon predetermined ones of said feedback voltages, the signal processing means having three feedback inputs each associated with a respective one of said feedback voltages and three outputs each associated with a respective one of said output voltages;

(d) input current signal processing means responsive to the signal current through said line and to said output current processing means feedback voltages for generating three output voltages, each of said output voltages being dependent upon said signal current and upon predetermined ones of said feedback voltages, the signal processing means having three feedback inputs each associated with a respective one of said feedback voltages and three outputs each associated with a respective one of said output voltages;

(e) three line conditioning control means each responsive to the output voltages of said input voltage processing means and the output voltages of said input current processing means, each of said line conditioning control means having two inputs and two outputs, one of said inputs associated with one of the outputs of said input voltage processing means and the other of said inputs associated with one of the outputs of said input current processing means and one of said outputs associated with one of the inputs of said output voltage processing means and the other of said outputs associated with one of the inputs of said output current processing means; and (f) means for connecting the inputs and outputs of said conditioning control means to said outputs and inputs of said input and output processing means, whereby said three independent non-interactive simultaneous effects in the transmission characteristics are provided.

* * * * *